United States Patent
Shu et al.

(10) Patent No.: US 12,101,684 B2
(45) Date of Patent: Sep. 24, 2024

(54) POSITIONING IN WIRELESS COMMUNICATION NETWORKS

(71) Applicant: Telefonaktiebolaget LM Ericsson (publ), Stockholm (SE)

(72) Inventors: Di Shu, Shanghai (CN); Fredrik Gunnarsson, Linköping (SE); Andreas Hansson, Karlskrona (SE); Åke Busin, Sollentuna (SE); Anders Hellström, Vaxholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 401 days.

(21) Appl. No.: 17/297,357

(22) PCT Filed: Nov. 30, 2018

(86) PCT No.: PCT/CN2018/118406
§ 371 (c)(1),
(2) Date: May 26, 2021

(87) PCT Pub. No.: WO2020/107369
PCT Pub. Date: Jun. 4, 2020

(65) Prior Publication Data
US 2022/0053285 A1 Feb. 17, 2022

(51) Int. Cl.
*H04W 4/02* (2018.01)
*G01S 5/02* (2010.01)
*G16Y 40/60* (2020.01)

(52) U.S. Cl.
CPC ........... *H04W 4/023* (2013.01); *G01S 5/0252* (2013.01); *G16Y 40/60* (2020.01)

(58) Field of Classification Search
CPC ....... H04W 4/023; H04W 4/025; H04W 4/70; G01S 5/0252; G01S 5/02524; G01S 5/02526; G01S 5/0258; G16Y 40/60
See application file for complete search history.

(56) References Cited

U.S. PATENT DOCUMENTS 10,045,352 B2* 8/2018 Yue ............... H04B 7/0617
2004/0203856 A1 10/2004 Wigren et al.
(Continued)

FOREIGN PATENT DOCUMENTS

CN 104849741 A 8/2015
CN 108076435 A 5/2018
(Continued)

OTHER PUBLICATIONS

"Ericsson Mobility Report", On the Pulse of the Networked Society, Jun. 2016, 1-32.
(Continued)

*Primary Examiner* — Siu M Lee
(74) *Attorney, Agent, or Firm* — Murphy, Bilak & Homiller, PLLC

(57) ABSTRACT

A method for assisting in position determination in a wireless communication system comprises obtaining (S1) of pairs of radio frequency environment data sets for each of a plurality of common positions. A pair of radio frequency environment data sets comprises radio frequency environment data of devices of a first access technology and a second access technology at a common position. A transformation operator is created (S2) based on the pairs. The transformation operator represents a relation between radio frequency environment data sets of the first and second access technology. A method for position determination in a wireless communication system based on transformation operator and network nodes therefore is also disclosed, as well as network nodes for performing the methods.

17 Claims, 17 Drawing Sheets

(56) References Cited

U.S. PATENT DOCUMENTS

| | | | |
|---|---|---|---|
| 2010/0208607 A1* | 8/2010 | Chin | H04W 36/0044 |
| | | | 370/252 |
| 2011/0065450 A1 | 3/2011 | Kazmi | |
| 2013/0109405 A1 | 5/2013 | Siomina et al. | |
| 2014/0295847 A1* | 10/2014 | Futaki | H04W 36/0058 |
| | | | 455/436 |
| 2016/0161592 A1 | 6/2016 | Wirola et al. | |
| 2017/0064669 A1* | 3/2017 | Murphy | H04W 56/001 |
| 2018/0275261 A1 | 9/2018 | Khan et al. | |

FOREIGN PATENT DOCUMENTS

| | | |
|---|---|---|
| CN | 108111973 A | 6/2018 |
| WO | 2008118052 A1 | 10/2008 |
| WO | 2009124206 A2 | 10/2009 |
| WO | 2011040856 A1 | 4/2011 |

OTHER PUBLICATIONS

Gunnarsson, Fredrik, et al., "IoT positioning in LTE standardization", https://www.ericsson.com/en/blog/2017/3/ot-positioning-in-lte-standardization, accessed May 6, 2021, Ericsson, Mar. 9, 2017, 1-5.

"Cellular networks for massive IoT", Ericsson White Paper, Jan. 2016, pp. 1-13.

Wigren, T., "Adaptive Enhanced Cell-ID Fingerprinting Localization by Clustering of Precise Position Measurements", IEEE Transactions on Vehicular Technology, vol. 56, No. 5, Sep. 2007, 1-11.

\* cited by examiner

POSITIONING IN WIRELESS COMMUNICATION NETWORKS

TECHNICAL FIELD

The proposed technology generally relates to position determination in a wireless communication system, and in particular to a method, a network node, a computer program and a computer program product for assisting in position determination and for position determination in a wireless communication system.

BACKGROUND

Internet of Things (IOT) or as sometimes termed Machine Type Communications (MTC) networks facilitate data communication between devices without human interaction. The number of connected IoT devices is expected to grow rapidly and outnumber the mobile phones as the largest category of connected devices by 2018. By 2021 the number of IoT devices is predicted to reach 16 billion and it is further expected that a large number of these devices are connected through cellular technologies. Third Generation Partnership Project (3GPP) has standardized a number of Cellular IoT (CIoT) specific features and is expected to continuously evolve these features in coming work. Massive IoT is thus expected.

Location, as a fundamental information, is critical to many IoT use cases and adds value to most cases. Smart 'things', such as wearables, Transport 'things', such as asset tracking, and Sensing "things", such as environmental monitoring, are a few examples. Location information is thus of great importance to IoT use cases. However, there are several challenges when designing a ubiquitous positioning solution for Massive IoT devices. One of the challenges is that the IoT devices involved in many use cases require low cost, low-power consumption and the possibility to communicate in the most challenging locations in terms of coverage. They may therefore not support Global Positioning System (GPS) or other Global Navigation Satellite Systems (GNSS). Furthermore, they may be located indoors or even deep indoors. The "thing" may be located in a basement or even in a mine shaft.

The most efficient positioning method to address the above conditions would be one that utilizes the foundation of communication. In other words, it would be of benefit if the positioning method is based only on the radio measurements intrinsically needed in normal communication, while no extra capability requirements are put on device. Fingerprinting is such a method. However, fingerprinting requires a data collection stage to build up the reference database and this can be a setback when applying the method to IoT devices as there is a lack of efficient way of data collection, such as Minimization of Drive Tests (MDT) available for e.g. Long-Term Evolution (LTE) systems.

SUMMARY

It is an object to provide methods and devices for performing and/or assisting in positioning of massive IoT devices.

This and other objects are met by embodiments of the proposed technology.

According to a first aspect, there is provided a method for assisting in position determination in a wireless communication system. The method comprises obtaining of pairs of radio frequency environment data sets for each of a plurality of common positions. A said pair of radio frequency environment data sets comprises radio frequency environment data of a first access technology for a first wireless device connected by the first access technology and radio frequency environment data of a second access technology for a second wireless device connected by the second access technology, respectively. The first access technology is different from the second access technology. The first wireless device is co-located with the second wireless device at the common position. A transformation operator is created based on the plurality of the pairs of the radio frequency environment data sets. The transformation operator represents a relation between radio frequency environment data sets of the first and second access technology, respectively. Thereby, a radio frequency environment data set of the first access technology inputted into the transformation operator gives an output of an estimation of a radio frequency environment data set of the second access technology and/or a radio frequency environment data set of the second access technology inputted into an inverse of the transformation operator gives an output of an estimation of a radio frequency environment data set of the first access technology.

According to a second aspect, there is provided a method for position determination in a wireless communication system. The method comprises transforming of an obtained radio frequency environment data set of a first access technology for a wireless device to be positioned into a radio frequency environment data set of a second access technology by using a transformation operator. The transformation operator is created according to a method for assisting in position determination in a wireless communication system of the first aspect. A location definition of the wireless device to be positioned is determined by using a second database, assisting in positioning by Adaptive Enhanced Cell ID, applied to the radio frequency environment data set of the second access technology for the wireless device to be positioned, giving a location definition for the wireless device to be positioned. The second database represents relations between radio frequency environment data sets of the second access technology and respective location definitions. The location definitions are positions or area definitions.

According to a third aspect, there is provided a network node configured to assist in position determination in a wireless communication system. The network node comprises a processing circuitry and a memory. The memory comprises instructions executable by the processing circuitry. The processing circuitry is operative to obtain pairs of radio frequency environment data sets for each of a plurality of common positions. A said pair of radio frequency environment data sets comprises radio frequency environment data of a first access technology for a first wireless device connected by the first access technology and radio frequency environment data of a second access technology for a second wireless device connected by the second access technology, respectively. The first access technology is different from the second access technology. The first wireless device is co-located with the second wireless device at the common position. The processing circuitry is further operative to create a transformation operator based on the plurality of the pairs of the radio frequency environment data sets. The transformation operator represents a relation between radio frequency environment data sets of the first and second access technology, respectively. Thereby, a radio frequency environment data set of the first access technology inputted into the transformation operator gives an output of an estimation of a radio frequency environment data set of the second access technology and/or a radio frequency environment data set of the second access technology inputted into the transformation operator gives an output of an estimation of a radio frequency environment data set of the first access technology.

According to a fourth aspect, there is provided a network node configured to determine positions in a wireless communication system. The network node comprises a processing circuitry and a memory. The memory comprises instructions executable by the processing circuitry. Thereby, the processing circuitry is operative to transform an obtained radio frequency environment data set for the wireless device to be positioned into a radio frequency environment data set of the second access technology for the wireless device to be positioned by using a transformation operator. The transformation operator is created according to a method for assisting in position determination in a wireless communication system of the first aspect. The processing circuitry is further operative to determine a location definition of the wireless device to be positioned by using a second database, assisting in positioning by Adaptive Enhanced Cell ID, applied to the radio frequency environment data set of the second access technology for the wireless device to be positioned, giving a location definition for the wireless device to be positioned. The second database represents relations between radio frequency environment data sets of the second access technology and respective location definitions. The location definitions are positions or area definitions.

According to a fifth aspect, there is provided a computer program comprising instructions, which when executed by at least one processing circuitry, cause the at least one processing circuitry to obtain pairs of radio frequency environment data sets for each of a plurality of common positions. A said pair of radio frequency environment data sets comprises radio frequency environment data of a first access technology for a first wireless device connected by the first access technology and radio frequency environment data of a second access technology for a second wireless device connected by the second access technology, respectively. The first access technology is different from the second access technology. The first wireless device is co-located with the second wireless device at the common position. The instructions, when executed by the at least one processing circuitry, cause the at least one processing circuitry to further create a transformation operator based on the plurality of the pairs of the radio frequency environment data sets. The transformation operator represents a relation between radio frequency environment data sets of the first and second access technology, respectively. Thereby, a radio frequency environment data set of the first access technology inputted into the transformation operator gives an output of an estimation of a radio frequency environment data set of the second access technology and/or a radio frequency environment data set of the second access technology inputted into an inverse of the transformation operator gives an output of an estimation of a radio frequency environment data set of the first access technology.

25 According to a sixth aspect, there is provided a computer program comprising instructions, which when executed by a processing circuitry, cause the processing circuitry to transform an obtained radio frequency environment data set for a wireless device to be positioned into a radio frequency environment data set of a second access technology for a wireless device to be 30 positioned by using a transformation operator. The transformation operator is created according to a method for assisting in position determination in a wireless communication system of the first aspect. The instructions, when executed by the processing circuitry, cause the processing circuitry to determine a location definition of the wireless device to be positioned by using a second database assisting Adaptive Enhanced Cell ID applied to the radio frequency environment data set of the second access technology for the wireless device to be positioned, giving a location definition for the wireless device to be positioned. The second database assisting Adaptive Enhanced Cell ID represents relations between radio frequency environment data sets of the second access technology and respective location definitions. The location definitions are positions or area definitions.

According to a seventh aspect, there is provided a computer-program product comprising a computer-readable medium having stored thereon a computer program comprising instructions which, when executed on a processing circuitry, cause the processing circuitry to carry out the method according to the first or second aspect.

One advantage of the proposed technology is that the technology is device agnostic. Furthermore, it requires only low cost implementation and low power consumption on the device side. At the same time, it provides high accuracy and is therefore an excellent complement to GNSS in difficult conditions. The proposed technology is also standardization compliant, e.g. with 3GPP, operator LTE/5G-NR assets, of LTE or Fifth Generation New Radio (5G-NR). The proposed technology is leveraged to increase the efficiency and it is automated and self-learning.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
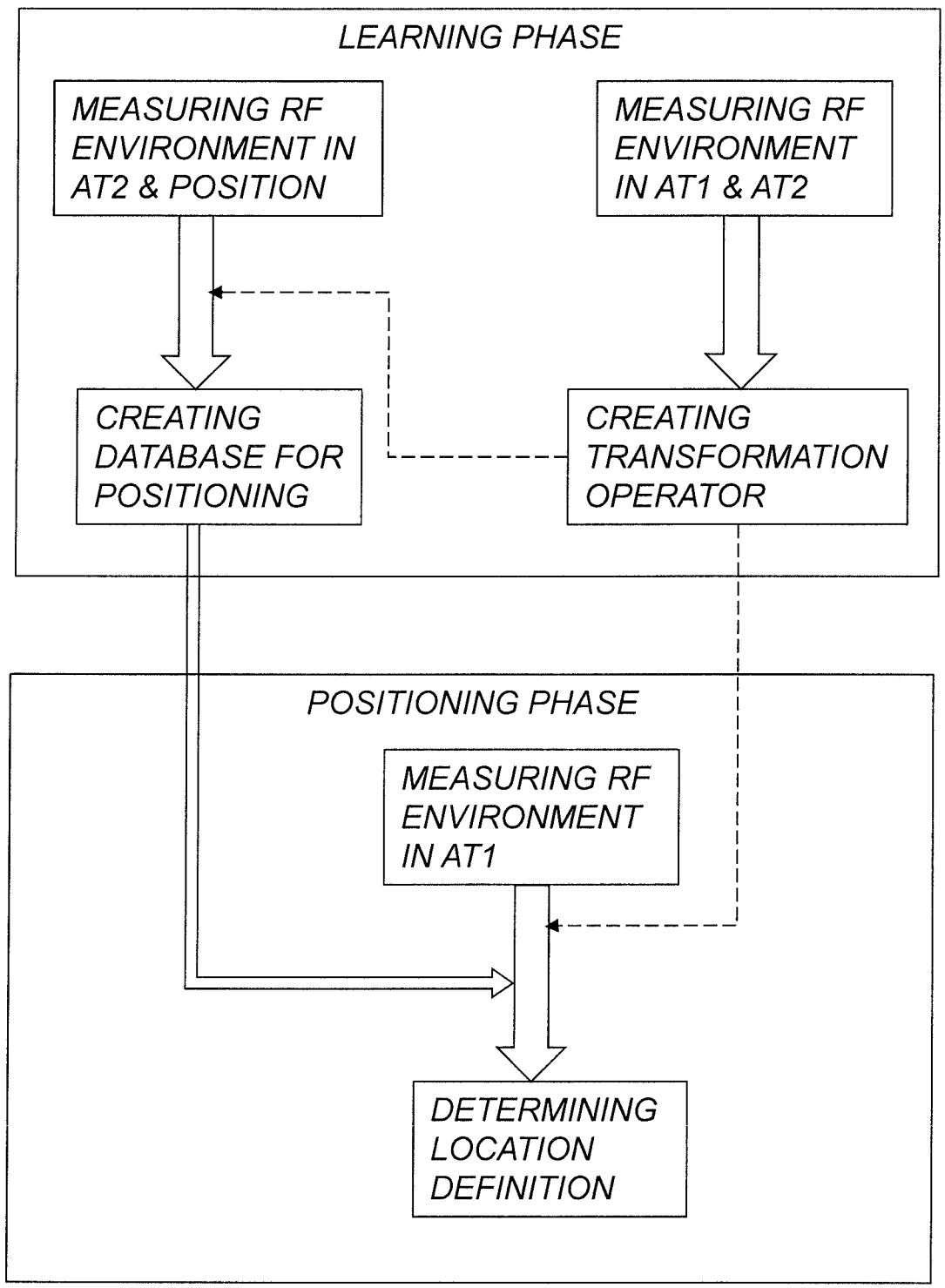
FIG. 1 is a schematic illustration of creation and use of a transformation operator in a learning phase and a positioning phase.

Throughout the drawings, the same reference designations are used for similar or corresponding elements.

For a better understanding of the proposed technology, it may be useful to begin with a brief overview of IoT systems and an analysis of the technical problem.

IoT is today used for a large variety of things. It is often used in different kinds of sensing things. Non-exclusive examples can be thermometers, smoke detectors, fire alarms, mechanical position sensors, locks, counting sensors, electrical meters, water meters, gas meters, timers, wireless position sensors, medical monitors etc. Many such items are today also evolved into different kinds of "smart" things. Non-exclusive examples can be medical surveillance, occasion controlled sampling, locking mechanisms, surveillance cameras, gaming devices, robots, smart alarms, smart labels etc. IoT is also in many cases involved in things that can be moved or transported. Non-exclusive examples can be vehicles such as cars, trains, trams, bikes, lorries, ships, or transported cargo, traffic surveillance positioning, sports, industrial flows etc. Common for many of these items using IoT is that a determination of a present positon often is requested.

Fingerprinting technologies, as today commonly used in wireless communication networks, represent a family of Path Loss based technologies that rely on matching the RF environment, as experienced by the User Equipment (UE), to the known or estimated or otherwise mapped characteristics of the larger RF System in which the UE is operating. This kind of positioning is also known as Radio Pattern Matching or Radio Signature positioning. Information from the UE, typically including measurements of serving and neighbor cell signal strengths, time delay and other network parameters form the basis of the RF environment to be compared to an established system's RF Database. One of the intents of this approach is to mitigate the negative impacts of anomalies within the RF environment that challenge the accuracy of trilateration technologies, e.g. multipath and reflection.

The RF fingerprinting positioning method is thus typically based on measurements made by the UE and the Base Station. The essential measurement set required for this method is currently defined in 3GPP for Evolved Universal Terrestrial Radio Access Network (EUTRAN) as an example and the measurement set is necessary for the basic mobility functionality and hence this method will work with existing mobiles without any modification. Fingerprinting positioning is possible to use in systems of Global System for Mobile communications (GSM), Wideband Code Division Multiple Access (WCDMA), LTE or 5G NR.

Fingerprinting positioning algorithms operate by creating a radio fingerprint for each point of a fine coordinate grid that covers the Radio Access Network (RAN). Each such measurement must be associated with an ID of a Radio Base Station (RBS). The fingerprint may e.g. comprise

- The cell IDs that are detected by the terminal, in each grid point
- Path loss or signal strength measurements, with respect to multiple RBSs, performed by the terminal, in each grid point
- Round Trip Time (RTT), in WCDMA, or Timing Advance (TA), in GSM and LTE, or UE Rx-Tx time difference, in LTE, in each grid point
- Noise rise, representing the load of a Code Division Multiple Access (CDMA) system, in each grid point
- Signal quality e.g. RxQual in GSM, Ec/NO in WCDMA and Reference Signal Received Quality (RSRQ) in LTE
- Radio connection information like the radio access bearer (RAB)
- Time
- Beam direction index that are detected by UE, in 5G NR, it includes ssb-Index and csi-rs-index; ssb-Index is the Synchronization Signal on Physical Broadcast Channel (SS/PBCH) block index associated to the measurement information to be reported, csi-rs-index is Channel State Information—Reference Signals (CSI-RS) resource index associated to the measurement information to be reported
- Angle of Arrival (AoA)
- Angle of Departure (AoD)

Whenever a position request arrives, a radio fingerprint is first measured, after which the corresponding grid points with similar characteristic are looked up and a location estimate is calculated and reported.

Adaptive Enhanced Cell ID (AECID) is one kind of fingerprinting positioning technology that refines the basic cell identity positioning method in a variety of ways. The AECID positioning method is based on the idea that high precision positioning measurements, e.g. GNSS measurements, or Assisted GNSS measurements, can be seen as points that belong to regions where certain cellular radio propagation condition persist. The AECID fingerprinting is e.g. described in the published international patent application WO 2008/118052 A1 or in the article "Adaptive Enhanced Cell-ID Fingerprinting Localization by Clustering of Precise Position Measurements" by T. Wigren in IEEE Transactions on Vehicular Technology, Vol. 56, No. 5, Sept. 2007, pp. 3199-3209.

AECID Involves 3 Major Steps:

Step 1: High accuracy positioning, e.g. GNSS positioning, is performed at the same time of a UE network signal measurement to acquire reference measurements. The UE network signal measurements can comprise the same components as mentioned above.

Step 2: Data processing and training technics are applied to the reference measurements, to extract radio characteristics associated with certain geolocation area and to build-up the radio pattern database.

Step 3: For an incoming positioning request, the UE's network measurement is firstly obtained. By pattern matching between the measurements reported from the UE and radio characteristics of the radio pattern database obtained in Step 2, the most likely location is estimated and reported back.

An AECID fingerprinting method applicable for Massive IoT positioning is difficult to obtain by prior art means. Due to that the IoT devices typically lack GNSS positioning facilities, the build-up of the radio pattern database becomes troublesome.

However, according to the here presented technology, it was understood that if there is a certain relationship between radio frequency environments of two different access technologies, e.g. LTE or 5G-NR vs IoT, such a relationship can be used to transform positioning properties from one access technology to the other. By creating a transformation operator constituting the link between the two different radio frequency environments, positioning properties of one of the access technologies can be utilized also by the other access technology.

It worth noting that the terminology 'LTE/5G-NR' and 'IoT', which refers to Massive IoT including LTE-M and NB-IOT, is used as typical examples in the description below. However, this can be generalized to two different, more generic radio access technologies, where there are relations between the deployments. In parts of the following description, "first" and "second" access technologies are used instead, which may be exemplified by e.g. IoT and LTE/5G-NR, respectively.

Also, the LTE/5G-NR device in such embodiments or examples is considered more capable, for example equipped with a GNSS chipset for accurate positioning. The IoT device may or may not have such facilitators. Also, the devices may or may not have GNSS coverage. Moreover, the LTE/5G-NR and IoT devices may have different antenna configurations, different number of antennas, and they can operate at different system bandwidths.

The typical fingerprinting positioning process comprises two stages, one measuring/learning stage, c.f. steps 1 and 2 of the AECID description above, in which the build-up of the radio pattern database takes place, and one positioning stage, where new measurement for a particular device are used together with the radio pattern database to find a position of the device. The above mentioned transformation operator can be utilized in either of these stages, which will be described more in detail below. Common for both these approaches utilizing the transformation operator in the different stages is, however, the creation and availability of the transformation operator.

FIG. 1 illustrates these relations in a schematic manner. In a learning phase, measurements of RF environments in a first access technology (AT1) and a second access technology (AT2) are made for devices locational associated with each other. From these measurements, a relation between the RF environments of AT1 and AT2 can be used to create a transformation operator. This transformation operator can "translate" an RF environment of AT1 into an RF environment of AT2. Preferably, the inverse is also possible, i.e. to translate an RF environment of AT2 into an RF environment of AT1. The very creation of this transformation operator opens up for improved performance in different positioning situations, where AT1 is utilized.

During the learning phase, also a database for positioning is created. As in prior art technology, measurements of RF environments in AT2 and associated positions are collected. Based on such measurement data, a database for positioning is created.

In one approach, the database for positioning is further based on the transformation operator, as indicated by the upper dotted line in FIG. 1. The transformation operator is thus responsible to provide a transformation of the measured RF environment of AT2 into an associated RF environment as if AT1 would have been used. The created database for positioning thus represents a relation database between RF environments of AT1 and a position. This database for positioning can thus be utilized in a positioning phase, in which input data in the form of RF environments of AT1 of a device to be positioned is provided. The RF environments of AT1 of the device to be positioned is associated with a location definition or position of the device by utilizing the database for positioning provided from the learning phase.

In another approach, the database for positioning is, in the learning phase, created according to standard routines, thereby creating a database for positioning representing a relation database between RF environments of AT2 and a position. In other words, the upper dotted arrow in FIG. 1 is not used. Instead, in the positioning phase, when measurements of an RF environment in AT1 of a device to be positioned are available, this RF environment in AT1 can be translated into an associated RF environment as if AT2 would have been used. This is performed by use of the inverse of the transformation operator, as indicated by the lower dotted arrow in FIG. 1. The so created AT2 RF environment is then used together with the database for positioning, which is created intended for inputs of AT2 RF environments.

As easily understood, the creation and use of the transformation operator is thus a single concept that is common of the different approaches. The transformation operator can be utilized for creating the database for positioning. The transformation operator can alternatively in reverse be utilized when using the database for positioning to find an associated location definition.

Figure 2:
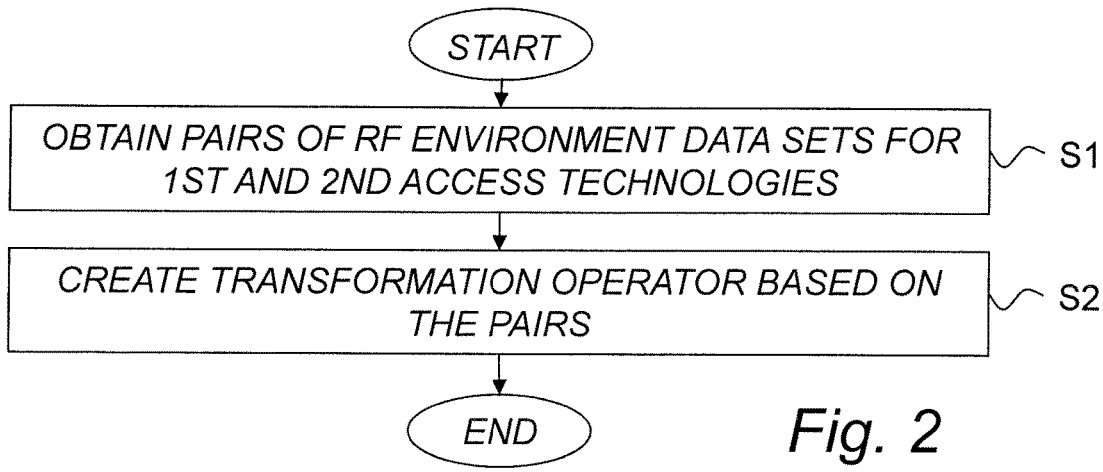
FIG. 2 illustrates a flow diagram of steps of an embodiment of a method for assisting in position determination in a wireless communication system.

FIG. 2 illustrates a flow diagram of steps of an embodiment of a method for assisting in position determination in a wireless communication system. In step S1, pairs of radio frequency environment data sets are obtained for each of a plurality of common positions. A said pair of radio frequency environment data sets comprises radio frequency environment data of a first access technology for a first wireless device connected by the first access technology to a first antenna of an antenna site and radio frequency environment data of a second access technology for a second wireless device connected by the second access technology to a second antenna of the antenna site, respectively. The first access technology is different from the second access technology. The first wireless device is co-located with the second wireless device at a said common position. In step S2, a transformation operator is created based on the plurality of the pairs of the radio frequency environment data sets. The transformation operator represents a relation between radio frequency environment data sets of the first and second access technology, respectively. This means that a radio frequency environment data set of the first access technology inputted into the transformation operator gives an output of an estimation of a radio frequency environment data set of the second access technology. Also, or alternatively, a radio frequency environment data set of the second access technology inputted into an inverse of the transformation operator gives an output of an estimation of a radio frequency environment data set of the first access technology.

In one embodiment, the first access technology is an access technology for Internet of Things.

In one embodiment, the first access technology is an access technology for Cellular Internet of Things.

In one embodiment, the first access technology is an access technology according to Category M1.

In one embodiment, the first access technology is Narrow-Band Internet of Things.

In one embodiment, the second access technology is a Long-Term Evolution access technology.

In one embodiment, the second access technology is a Fifth Generation New Radio access technology.

Raw measurements are performed as a data collection. The collection is done on a first access technology, e.g. an IoT network, and a second access technology, e.g. a LTE/5G-NR network. The measurements are made for a common position. One piece of raw measurement (MSR) contains radio measurements. The radio measurements typically comprise, for example, identifiers. Such identifiers may be identifiers of cells, typically Serving and possibly Neighbor Cell ID. The identifiers may also be associated to sites, antenna beams or transmission points. The radio measurements typically also comprise radio condition measurements such as radio signal strength.

In LTE, this is typically the Reference Signals Received Power (RSRP) and possibly Reference Signals Received Quality (RSRQ). Timing measurements related to the time of flight between device and site, or relative timing between different sites are also possibly performed. In LTE, the typical example is Timing Advance (TA) of the Serving Cell. Other radio measurements may comprise Angle of Arrival (AoA) and/or Angle of Departure (AoD).

The raw measurements can also be further annotated with additional information such as indoor/outdoor classification, radio propagation environment classification, etc.

In other words, in one embodiment, the radio frequency environment data comprises at least one of:
  radio signal strength of received radio signals within the concerned access technology;
  radio signal quality of received radio signals within the concerned access technology;
  angle of arrival of received radio signals within the concerned access technology;
  angle of departure of transmitted radio signals within the concerned access technology;
  identifiers of cells with which radio communication within the concerned access technology can be performed;
  identifiers of antenna beams by which radio communication within the concerned access technology can be performed;
  identifiers of transmission points from which radio communication within the concerned access technology can be performed;
  classification of an indoor or outdoor location; and
  classification of radio propagation environment.

Figure 3:
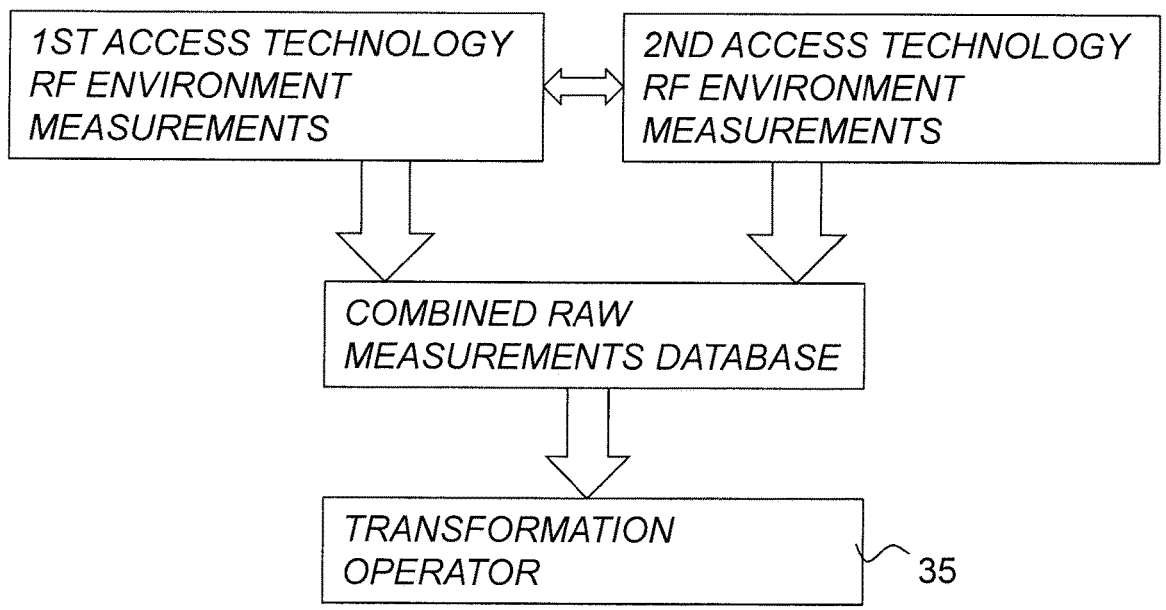
FIG. 3 is a schematic illustration of the relation of radio frequency environment measurements being the base for a transformation operator.

The measurements obtained by co-located devices, e.g. a LTE/5G-NR device and an IoT device, are indeed correlated. However, they are not necessarily the same due to the different hardware and system configurations. In order to exploit the raw measurements in an adequate manner, the correlation between the first and second access technology, e.g. IoT and LTE/5G-NR, may be modeled. This is schematically illustrated in FIG. 3. RF environment measurements of the first access technology is, as indicated by the double arrow, achieved at the same common location as RF environment measurements of the second access technology. These measurements can therefore be combined in a combined raw measurement database, comprising "pairs" of RF environment measurements. Here, LTE/5G-NR measurements will be denoted as measurements in a LTE/5G-NR reference frame, and IoT measurements will be denoted as measurements in an IoT reference frame.

Based on co-located measurements, it is possible to derive a transformation operator 35 that maps the measurements of one radio access technology to the other. This transformation operator can also be seen as an extrapolation function extrapolating measurements of one reference frame into another reference frame. Hence, measurements in the IoT reference frame can be translated to corresponding measurements in the LTE/5G-NR reference frame via the transformation operator 35, and/or vice versa, measurements in the LTE/5G-NR reference frame can be translated to corresponding measurements in the IoT reference frame via an inverse of the transformation operator 35.

The transformation operator or extrapolation function from/to LTE/5G-NR to/from IoT is a key enabler of feasibility and efficiency for the present technology.

Figure 4:
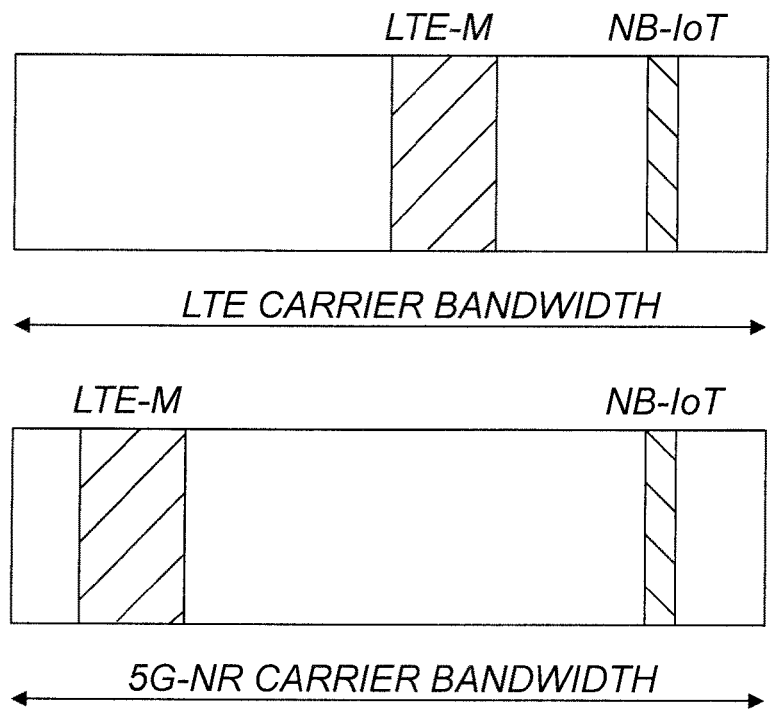
FIG. 4 is a schematic illustration of carrier distributions in LTE and 5G-NR.

It's not difficult to understand there shall be a certain relationship between a first access technology and a second access technology for a common location, so that the RF environment it can be "extrapolated" from one to the other. A typical example is LTE/5G-NR and IoT. In this an example, this pre-requisite is easily met under the common types of deployment of LTE/5G-NR and Massive IoT. Further simplifying the relation, LTE-M and In-Band/Guard-Band NB-IOT deployment naturally shares the same antenna of the LTE cell. In the upper part of FIG. 4, a LTE carrier bandwidth is illustrated, where a LTE.M band and a NB-IOT band are defined at different frequencies. The radio signal propagation may differ somewhat between the bands, but there is probably a high degree of correlation. The measured radio frequency environment associated with one of the access technologies will slightly differ from the radio frequency environment associated with the other of the access technologies, but in a manner possible to determine. For 5G-NR, as illustrated in the lower part of FIG. 4, one of the deployment scenarios that is supported from the start of 5G-NR work in 3GPP is to allow LTE-M and NB-IoT transmissions to be placed directly into a 5G NR frequency band.

In one embodiment, the second antenna is the same as the first antenna.

In one embodiment, the second antenna is different but co-located with the first antenna.

As mentioned earlier, in the transformation operator or extrapolation algorithm as illustrated below, LTE and IoT is used as example and similar idea apply for 5G-NR and IoT or more generically to any other two radio access technologies. The transformation operator can be determined for any combination of radio access technologies, but advantageously where there is a relationships in the deployments. In preferred embodiments, the first access technology has a first antenna at an antenna site and the second access technology has a second antenna at the same antenna site.

Figure 5:
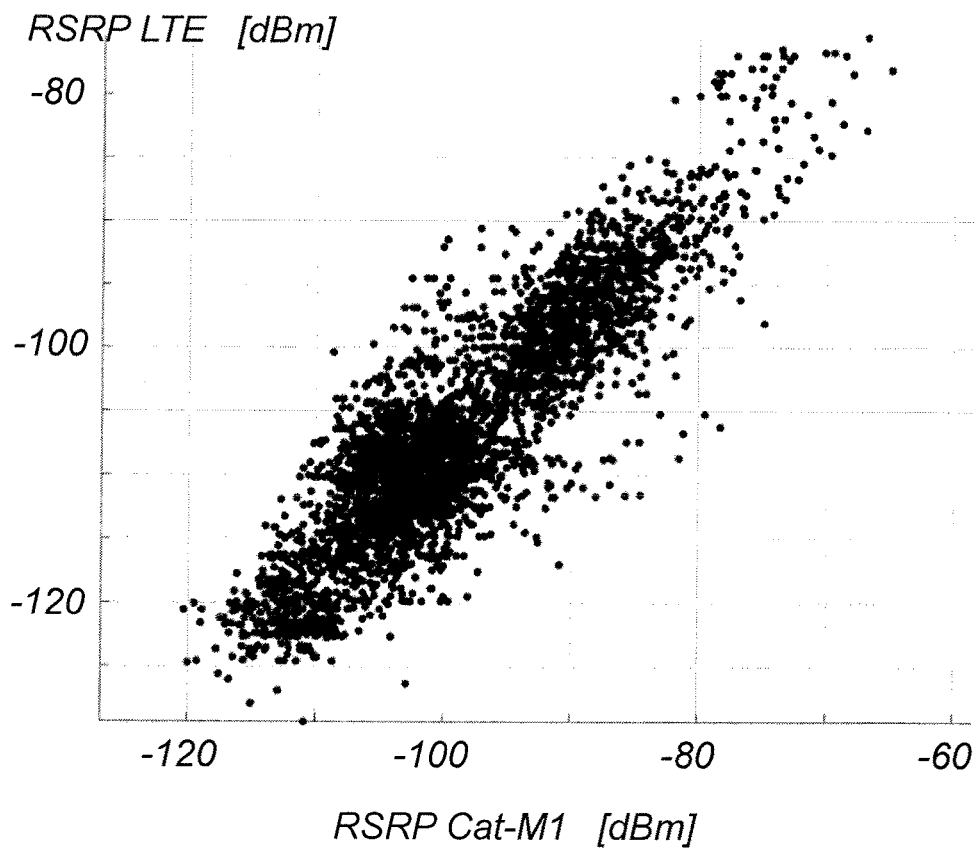
FIG. 5 is a diagram illustrating the correlation between Reference Signal Received Power of LTE vs. Cat-M1.

FIG. 5 illustrates different measurement set examples, relating RSRP between LTE and IoT of Cat-M1. The plot of LTE RSRP vs. Cat-M1 RSRP is based on data collected from a real field measurement. It can be seen that the relationship is reasonably consistent and in this particular case the relationship is more or less linear. In such a simple case, the transformation operator for the RSRP could be established as a simple scaling factor between LTE and IoT.

In a more general terminology, LTE raw measurement LTE_MSR, which may include for example the reported cell information, the signal strength (RSRP), can be expressed as LTE_MSR=[L_CELL_1, L_RSRP_1, L_CELL_2, L_RSRP_2, ..., L_CELL_N, L_RSRP_N]. The extrapolated IoT measurement IOT_MSR=[I_CELL_1, I_RSRP_1, I_CELL_2, I_RSRP_2, ..., I_CELL_N, I_RSRP_N]=$f$(LTE_MSR), where f(x) is the transforming operator, also referred to as the extrapolation function.

The mapping between Cell ID can be easily done based on the knowledge of the cell setup/configuration in the network. The transforming operator can in such cases be separated into part functions: IOT_MSR=[IOT$_{CELL\_ID}$, IOT$_{RSRP}$]= [$f_{ID}$(LTECELL_ID), $f_{rSrp}$(LTE$_{RSRP}$)].

The mapping between the RSRP can in a simple case with co-located antennas for IOT and LTE be based on I_RSRP=$f_{rsrp}$(L_RSRP) for each detectable cell. In a more mathematical terminology, I_RSRP_1=f1(L_RSRP_1), I_RSRP_2=f1(L_RSRP_2), I_RSRP_3=f1(L_RSRP_3), ... and so on. In some cases, the IoT and LTE/5G-NR may even utilize the same antenna. In the very simplest scenario, the $f_{rsrp}$ can even be a simple linear transformation.

In one embodiment, the first wireless device is connected by said first access technology to an antenna of an antenna site and said second wireless device is connected by said second access technology to the same said antenna of said antenna site.

In one embodiment, the first wireless device is connected by said first access technology to a first antenna of an antenna site and said second wireless device is connected by said second access technology to a second antenna of said antenna site, wherein said second antenna is different but co-located with said first antenna.

In different embodiments, the part extrapolation functions, relating to single RF environment data may be linear or non-linear.

Similar conditions are valid also for signal quality measurements.

In one embodiment, the radio frequency environment data comprises a radio signal strength of received radio signals within the concerned access technology and/or a radio signal quality of received radio signals within the concerned access technology. The step of creating the transformation operator thus comprises creating of a signal strength function transforming a radio signal strength of the first access technology and/or the second access technology into a radio signal strength of the second access technology and/or the first access technology, respectively, and/or creating of a signal quality function transforming a radio signal quality of the first access technology and/or the second access technology into a radio signal quality of the second access technology and/or the first access technology, respectively. In other words, the step of creating the transformation operator comprises at least one of:

creating of a signal strength function transforming a radio signal strength of the first access technology into a radio signal strength of the second access technology;

creating of a signal strength function transforming a radio signal strength of the second access technology into a radio signal strength of the first access technology;

creating of a signal quality function transforming a radio signal quality of the first access technology into a radio signal quality of the second access technology; and creating of a signal quality function transforming a radio signal quality of the second access technology into a radio signal quality of the first access technology.

In one further embodiment, the signal strength function and/or the signal quality function is a linear function.

Figure 6:
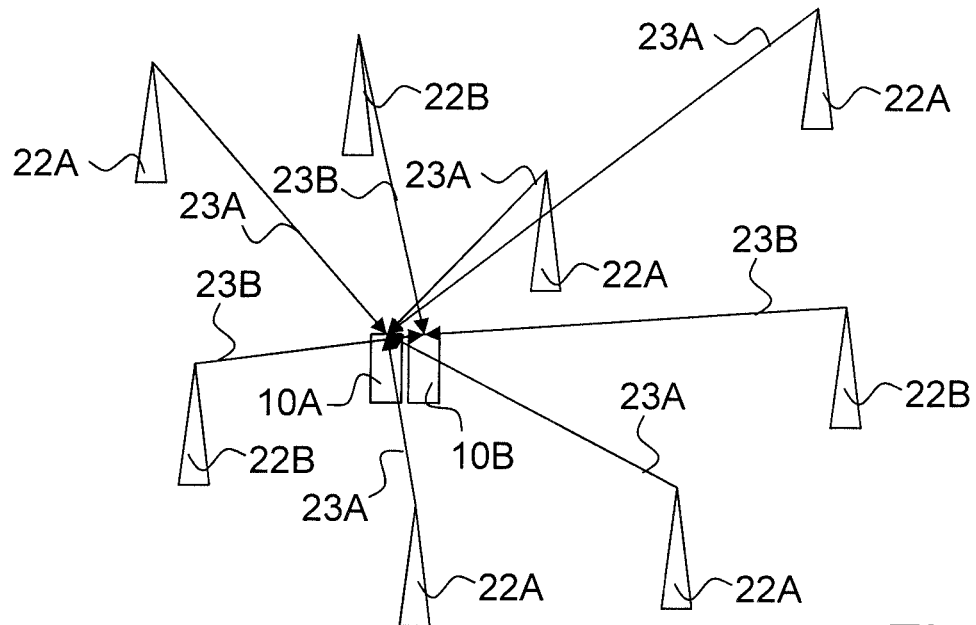
FIG. 6 is a schematic illustration of non-co-located antennas of two access technologies.

There is a correlation between different access technologies covering a same geographical area even if the antennas are non-co-located. FIG. 6 illustrates an area covered by two access technologies. A wireless device 10A utilizes a first access technology by radio signals 23A via antennas 22A. Another wireless device 10B utilizes a second access technology by radio signals 23B via antennas 22B. The wireless device 10A and wireless device 10B are situated at a common position. The wireless device 10A and the wireless device 10B may be constituted by a single unit having possibilities to communicate with more than one access technology. Each point in the geographical area will have a certain set of RF environment for each access technology, and a relation there between can, however, still be established.

Thus, in one embodiment, the first wireless device is connected by the first access technology to a first antenna of a first antenna site and the second wireless device is connected by the second access technology to a second antenna of a second antenna site, the second antenna site being different from the first antenna site.

The transformation operator for such a situation will typically be more complex than in the situation of co-located antennas. The simple function relations sketched above will in some embodiments be exchanged for functions, where the individual signal strengths measured for a first access technology becomes dependent on a multitude of signal strengths measured for a second access technology. Such dependencies are in general, due to the differing geographical distribution of the antennas, non-linear. Such dependencies can be determined by the obtained pairs of RF environment data sets, e.g. by use of different types of machine learning.

The transforming operator may be generically applicable or regional, with different functions applicable to different geographical regions. The transforming operator may be generically applicable or specific to different radio environments, with different functions applicable to different radio environments. The transforming operator may be generically applicable or specific to different coverage situations, with different functions applicable to different coverage situations. The transforming operator may be generally applicable or specific to different devices.

In one embodiment, the first transformation operator is the inverse of the second transformation operator.

In one embodiment, the signal strength function and/or the signal quality function is further dependent on a geographical region in which the common positions are situated.

In one embodiment, the signal strength function and/or the signal quality function is further dependent on a radio environment in which the common positions are situated.

In one embodiment, the signal strength function and/or the signal quality function is further dependent on a coverage situation of the common positions.

In one embodiment, the signal strength function and/or the signal quality function is specific for a type of wireless device for which the positioning is to be performed.

In some cases, there are measurements in one reference frame, i.e. of one access technology, that cannot be represented in a different reference frame, i.e. of the other access technology. One example is measurements in coverage extension regions such as deep indoors in an IoT reference frame that cannot be translated into an LTE/5G-NR reference frame since LTE/5G-NR has no coverage in such regions. Therefore, in one embodiment, the aspect of building penetration is considered, where reference measurements with positioning information is mainly available outdoors, while there is a keen interest in positioning of devices indoors. The outdoor reference measurements may then be translated to indoor measurements via a model function that comprises the building penetration loss.

In one embodiment, the step of creating the transformation operator comprises the further step of, for radio frequency environment data sets of the first access technology for which there does not exist any radio frequency environment data sets of the second access technology, creating estimated such radio frequency environment data sets of the second access technology by extrapolating, interpolating and/or by use of advanced machine learning techniques based on existing radio frequency environment data sets of the second access technology.

In one embodiment, the creation of estimated radio frequency environment data sets comprises utilization of models of building penetration losses.

When the transformation operator is created, this transformation operator can be utilized in the actual positioning procedure, as briefly illustrated in FIG. 1. As illustrated by the upper dotted arrow, in one embodiment, the second access technology reference measurements, e.g. LTE/5G-NR, are mapped to corresponding first access technology reference measurements, e.g. IoT, via the transformation operator. Then, a reference database used for positioning purposes is generated based on these positioned IoT reference measurements from the transformation operator. For any device at a later occasion to be positioned, there is a need to have measurements in the IoT reference frame.

Figure 7:
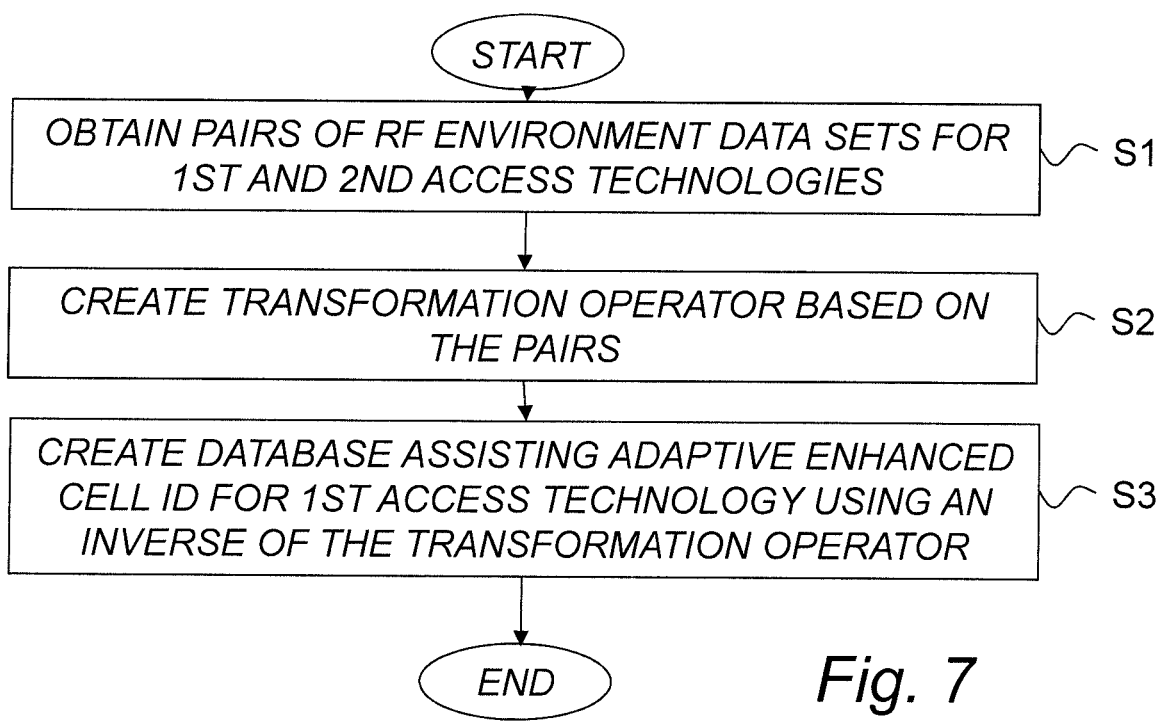
FIG. 7 is a schematic flow diagram illustrating steps of another embodiment of a method for assisting in position determination in a wireless communication system.

FIG. 7 illustrates a flow diagram of steps of an embodiment of a method for assisting in position determination in a wireless communication system. The steps S1 and S2 are described in connection with FIG. 2. In step S3, a (first) database is created from a fingerprint position database using the inverse of the transformation operator. The first database assists in positioning by Adaptive Enhanced Cell ID and represents relations between radio frequency environment data sets of the first access technology and respective location definitions. The location definitions are positions or area definitions. The fingerprint position database represents relations between radio frequency environment data sets of the second access technology and positions where the radio frequency environment data sets were determined.

The fingerprint position database, representing relations between radio frequency environment data sets of the second access technology and positions where the radio frequency environment data sets were determined, are achieved according to well-known procedures. Such fingerprint position databases are the fundaments of e.g. AECID positioning methods. The details of such a step, as such, is thus not of crucial importance for the technical effect of the present invention and are therefore only briefly discussed here below.

The raw measurements, i.e. the data collection forming the fingerprint position database, is performed within the second access technology, e.g. in LTE/5G-NR networks. One piece of MSR typically comprises radio measurements as have been described in connection with the build-up of the transforming operator. Typical components are thus Cell IDs, signal strengths, signal qualities, time-of-flight measurements and/or angle of arrival. In addition, however, a true or well estimated location where the radio measurement is collected is recorded. The raw measurements can also be further annotated with additional information such as indoor/outdoor classification, radio propagation environment classification, etc.

There are multiple ways of data collection. One example is Offline Data Collection, which means that radio measurements are collected by drive test, with specific drive test suites. The needed radio measurements together with the test device's true location, usually from embedded or standalone GPS device, are recorded.

Online Data Collection is also possible, collecting the radio measurements during e.g. Third Generation Partnership Project (3GPP) Control Plane Location Services (LCS) high accuracy positioning, e.g. based on Assisted Global Navigation Satellite Systems (A-GNSS). The radio measurement together with the A-GNSS positioning result are recorded.

A further alternative is Network Data Collection, which is to leverage e.g. the latest (Radio Access Network) RAN technology of Minimization of Drive Test (MDT). This means that the RAN can order the UEs to report the radio measurements together with the locations from standalone GNSS. MDT is presently considered as the most efficient way of data collection.

After raw measurements have been collected, data processing and training logic will be applied on the raw measurements to extract the radio patterns associated with specific geo-locations and build-up the database to be used for assisting in positioning by AECID and which database in this embodiment represents relations between radio frequency environment data sets of the first access technology and respective location definitions.

Such data processing may be performed according to known procedures in prior art AECID, with the addition of the use of the transformation operator to obtain the dependency of the radio frequency environment data sets of the first access technology. As long as there is a correspondence between radio frequency environment data sets of the different access technologies, the approach is straightforward.

In some applications, there might be wireless devices utilizing the first access technology that besides the ability to obtain measures of the RF environment also has information of its exact position. One example of achieving the position information could be to add a known static position of the wireless device. Another example could be wireless devices that are equipped with positioning functionality, e.g. according to GNSS. Yet another example could be to bring another device having positioning functionality to be co-located with the wireless device when the RF environment data set is obtained. This information, directly connecting an RF environment data set with a position, can by advantage be used to further enhance the reliability of the database to be used for assisting in positioning by AECID.

Thus, in other words, in one embodiment, the method for assisting in position determination in a wireless communication system comprises the further step of enhancing the accuracy of the first database by further utilizing radio frequency environment data sets of the first access technology having an associated measured or estimated location of the wireless device.

However, depending on the actual geographical area to be covered, some special aspects may have to be considered in order to further enhance the usability of the present ideas.

In one scenario, the collected LTE/5G-NR raw measurements may mostly come from outdoor area, as relying on the GNSS reads, leaving some holes in the indoor area. An IoT network is expected to have extended coverage, e.g. deep indoor, basement area that may not reachable by LTE/5G-NR. The holes can be filled up by interpolation, extrapolation or advanced machine learning techniques together with e.g. GIS/Map information.

The aspect of building penetration may be considered, where reference measurements with positioning information is mainly available outdoors, while there is a keen interest in positioning of devices indoors. The reference measurements may therefore be translated to indoor measurements via an extrapolation function that comprises estimated or modelled building penetration loss.

In case no training data is available for some reference aspects, other modeling strategies can be considered. For example, a radio propagation model, relating propagation loss to distance could be considered to estimate the travelled distance of a signal.

Figure 8:
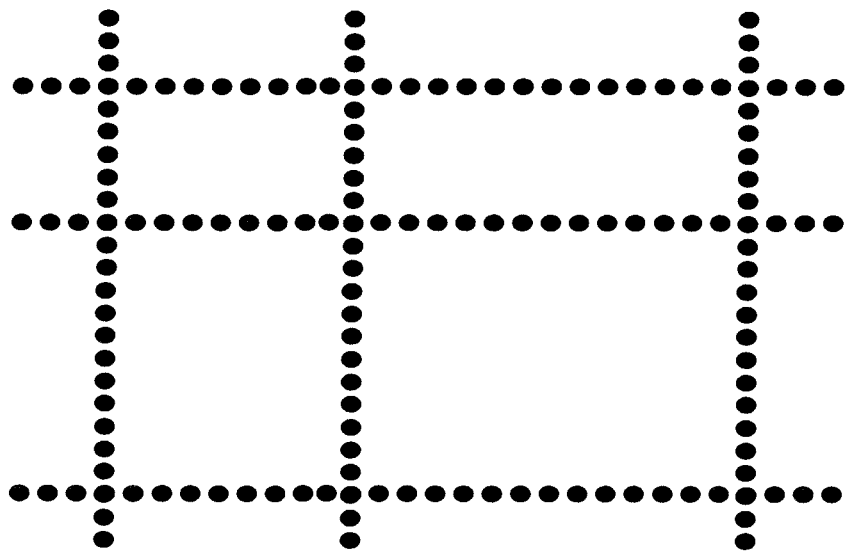
FIG. 8 is a schematic illustration of interpolation of radio frequency environment measurements.
Figure 8:
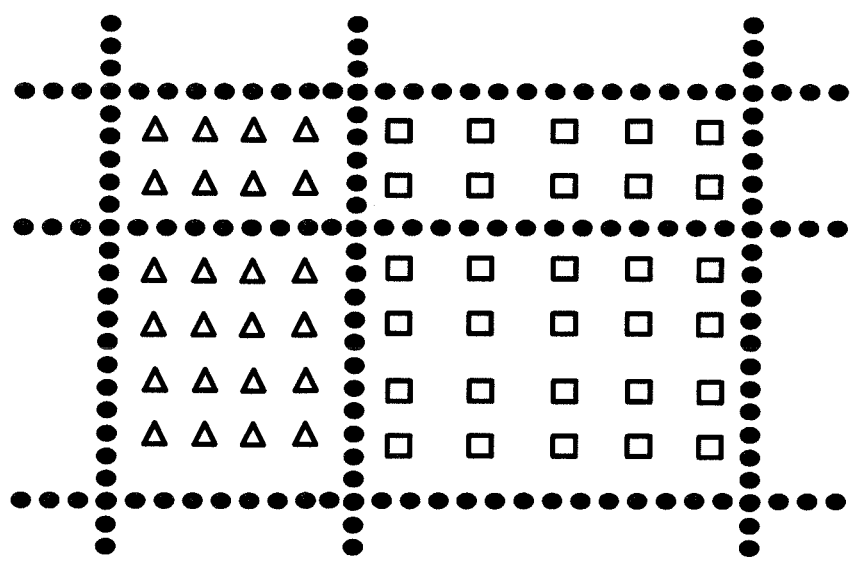

In FIG. 8, the upper part illustrates an urban map indicating positions where raw measurements have been performed by MDT. It is obvious that the streets and other communication paths are well represented while there are "white" areas between, mainly indoor locations. In the lower part, a corresponding map is illustrated, where extrapolation and modelling has been used to "fill in" some of the white areas. The triangles represent extrapolated indoor positions and the squares represent extrapolated deep indoor positions.

Different areas covered by an access technology may have widely differing conditions regarding e.g. RF environments. For instance, conditions for outdoor communication typically differ considerably with conditions for adapted indoor communication. It may therefore, according to one embodiment, be useful to divide a fingerprint database into different scenarios, e.g. indoor/outdoor, in order to optimize the training in each scenario separately.

Thus in one embodiment, the step of creating a first database is based on a division of radio frequency environment data sets into scenarios, whereby each scenario is handled separately.

In a further embodiment, these scenarios comprises an indoor scenario and an outdoor scenario.

Besides such fingerprints map refined for different scenarios, the scenario decision criteria itself can also be the output of the training. This assists in deciding which version of fingerprints map among all to use.

Figure 9:
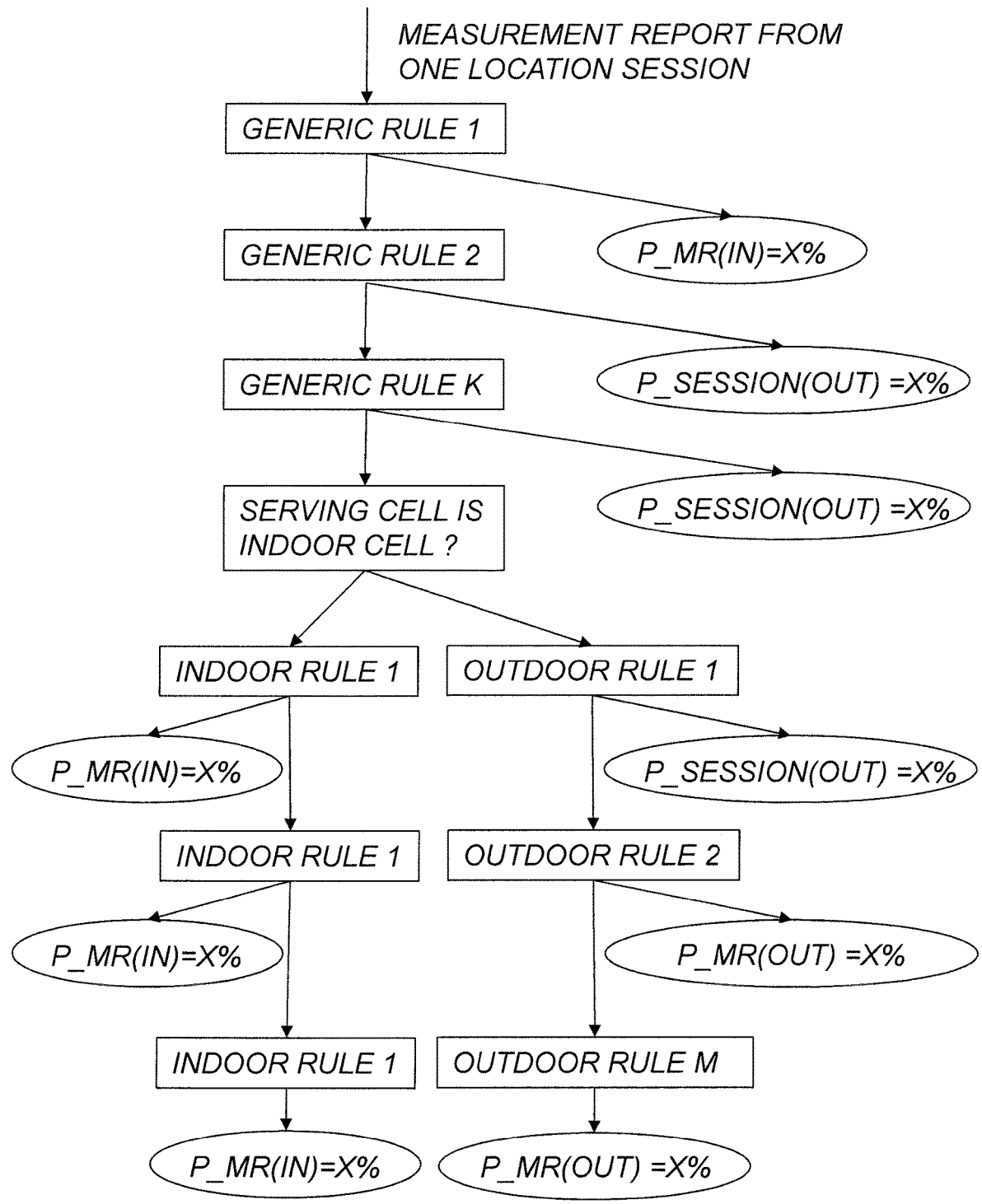
FIG. 9 is a flow diagram of a use of scenario decision criteria.

One exemplary model to predict if a location session comes from indoor or outdoor may look like the decision tree illustrated in FIG. 9.

The decision flow works as following. During a location session, one or more pieces of measurement reports can be collected. Each measurement report may include various information and typically the serving cell, the neighbor cells, the signal strength of cells, the Timing Advance or alike etc. The measurement report(s) are sent into the decision tree and checked against a set of rules which may include "Generic Rules", "Indoor Rules" and "Outdoor Rules" until a probability of the measurement report(s) come from indoor or outdoor is decided.

Some of the rules apply to each measurement report from a location session individually and the probability of the location session coming from indoor/outdoor is the combined probabilities of each measurement report, e.g. the averaged probability. This kind of rules are referred as "MR Rule" in the Figure.

While some other rules apply to the measurement reports from a location session collectively, the probability of the location session coming from indoor/outdoor is the direct output probability of these kind of rules. This kind of rules are referred as "Session Rule" in the Figure.

Starting from the "Generic Rule 1" on the top of FIG. 9. "Generic Rule 1" can be for example: Whether more than 3 indoor cells are reported in one measurement report? This rule is an "MR Rule". If the rule is met, which may be a strong indication of the measurement report comes from indoor, then high probability X % of the specific measurement report comes from indoor is assigned.

If the rule is unmet, the measurement report is sent to the next "Generic Rule 2". "Generic Rule 2" can be for example: Whether the cell centroids separation of the measurement reports is greater than e.g. 500 meter in an urban area. The "centroid" is defined as the arithmetic mean, or average, position of all reported sites, i.e. distinct location of cells, by an individual measurement report. The "centroid separation" is defined as the distance between different centroids from measurement reports in the same location session. This rule is a "Session Rule". If the rule is met, then high probability X % of the location session comes from outdoor is decided.

If the rule is unmet, the measurement report(s) are sent to the next "Generic Rule". After the last "Generic Rule K" is passed and if a probability of the measurement report(s) or the location session come from indoor or outdoor has not yet been decided, the measurement report(s) are sent to the next leaf. If the serving cell of the measurement report(s) is an indoor cell, then the measurement report(s) are further sent to the branch consisting a bunch of "Indoor Rules".

Otherwise, which means the serving cells of the measurement report(s) is an outdoor cell, the measurement report(s) are sent to the branch consisting a bunch of "Outdoor Rules".

If the measurement reports go to the "Indoor Rule" branch, the measurement report(s) are checked against each "Indoor Rule i (i=1,2 . . . N)" until a probability of the measurement reports or location session come from Indoor/Outdoor is decided.

"Indoor Rule 1" can be for example: Whether there aren't any neighbor cells are reported in the measurement report. This is an "MR rule". If the rule is met, then a high probability X % of the measurement report coming from indoor is assigned.

If the rule is unmet, the measurement reports are sent to the next "Indoor Rule".

Similar logics apply in the "Outdoor Rule" branch. "Outdoor Rule 1" can be for example: Whether the Timing Advance from all the measurement reports in the location session vary greater than certain distance. This is a "Session Rule". If the rule is met, then a high probability X % of the location session coming from outdoor is assigned.

If the rule is unmet, the measurement reports are sent to the next "Outdoor Rule".

Figure 10:
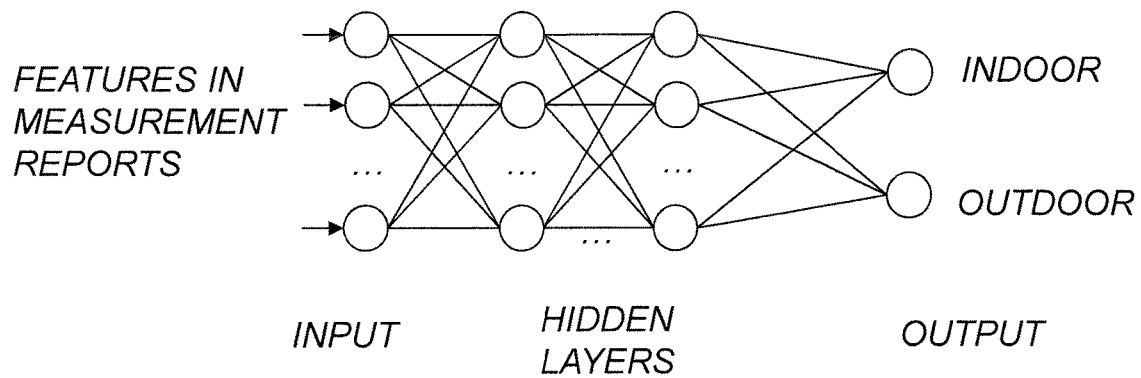
FIG. 10 is a schematic illustration of a selection between an indoor and outdoor scenario.

Besides the model above, other machine learning type of technologies may also apply for the purpose, for example by using Supervised Training with Neural Networks, as illustrated in FIG. 10.

Thus in one embodiment, scenario decision criteria are obtained by training on measured radio frequency environment data sets.

In the present embodiment, the raw measurements, or compilations thereof, are translated to a specific reference frame, the reference frame of the first access technology, e.g. IoT. These raw measurements may also be combined with aspects such as region, radio environment, coverage situation and/or device.

Figure 11:
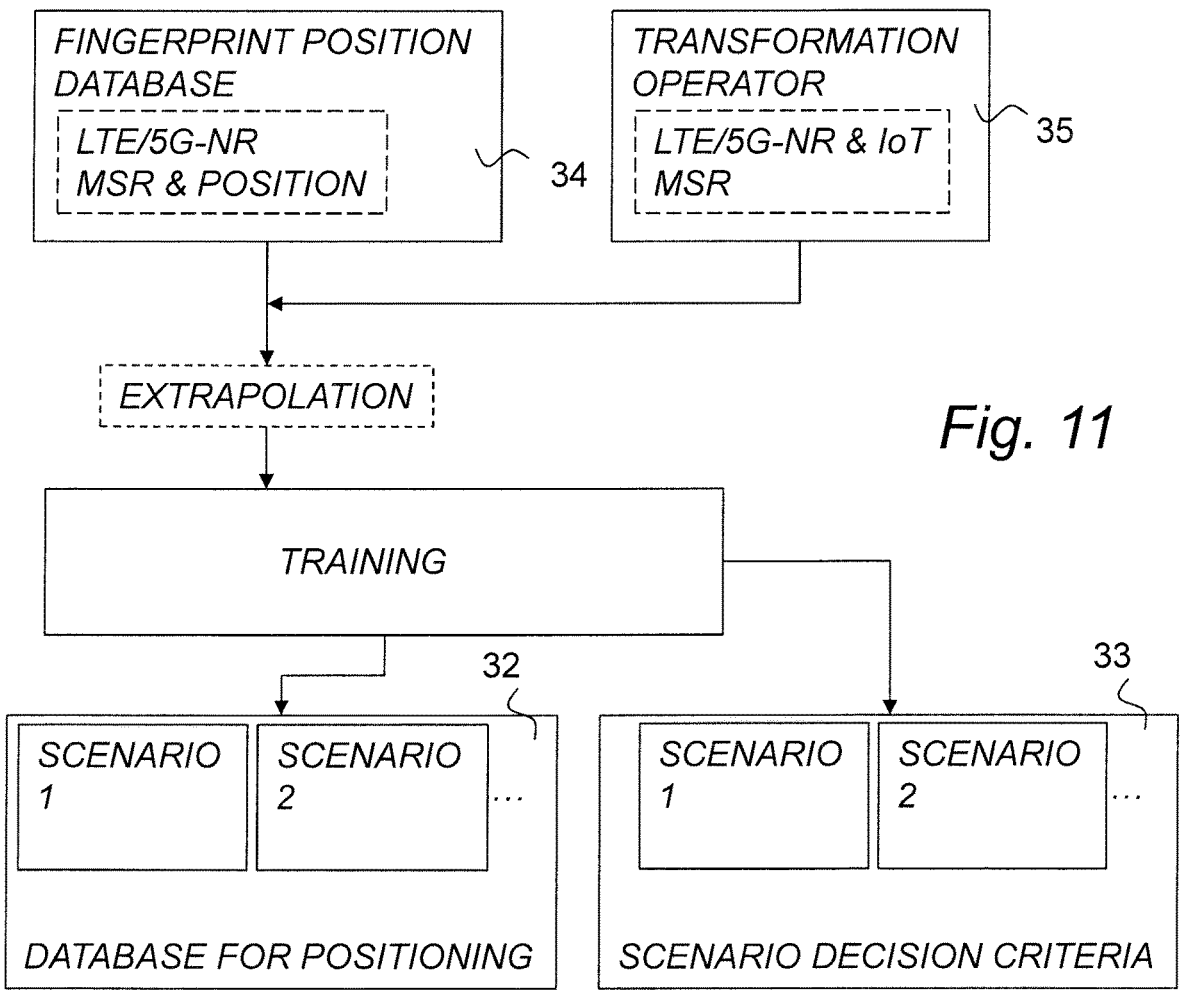
FIG. 11 is an illustration of measurements translated into a first access technology before training of a positioning database.

One embodiment is illustrated schematically in FIG. 11. A transformation operator 35 is created, e.g. based on LTE/5G-NR measurements and IoT measurements. A fingerprint position database 34 is collected, and possibly also at least partly compiled, e.g. based on LTE/5G-NR measurements and corresponding accurate positions. These data sources are combined, possibly also in combination with different extrapolation into "white" areas, and are used in a training operation. The training operation gives a database 32 for assisting in positioning, e.g. AECID, possibly divided into different scenario.

Also, the training may give rise to scenario decision criteria 33 for the scenarios.

This approach thus means that the measurements are translated into the first access technology reference frame before training. The database correlation is therefore performed in the first access technology reference frame.

Figure 12:
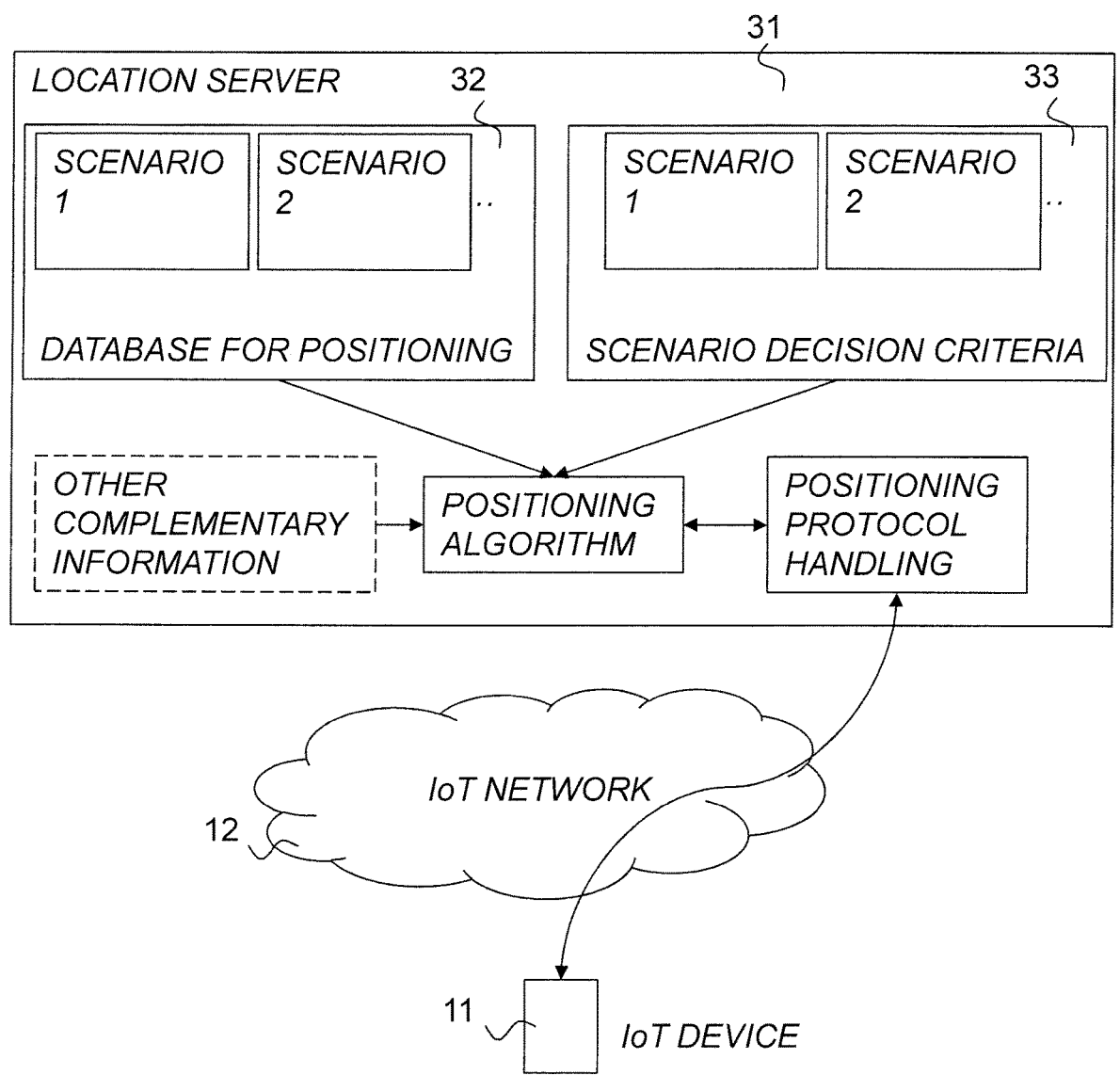
FIG. 12 is an illustration of the use of a trained positioning database.

After the training is done, the output in form of a database 32 for positioning is, as illustrated in FIG. 12, loaded to the location server 31 and the system is ready to take positioning traffic.

The positioning flow can be based on the Control Plane or the User Plane. After getting a location request, the location server retrieves the IoT measurements measured by the IoT device 11, via the IoT network 12. If a division into scenario is made, the scenario in which the device is, is decided by searching the scenario decision criteria 33. The target fingerprints version associated with the decided scenario in the fingerprints database is selected by use of the scenario decision criteria 33.

The location server 31 performs the fingerprinting positioning algorithm and get the location estimate, optionally with other complementary information, e.g. cell data etc. The location estimate is reported back to the location initiator.

As mentioned further above, it is not difficult to derive that the above solution can be organized in alternative ways without impacting the core idea of utilizing a transforming operator. For example, it is possible to perform the transforming algorithm during positioning phase and in the reversed way. Then, the IoT measurements reported by the IoT device is converted to LTE/5G-NR measurements. The fingerprinting positioning is then performed all based on LTE/5G-NR measurements. In the preparation and training phase, besides the creation of the transforming operator, the relevant logics are then all on the LTE/5G-NR version of the measurements with accompanied positions without converting it into IoT in advance. There will be trade-off on e.g. disk size, calculation complexity, time delay etc. among different alternatives.

In other words, the LTE/5G-NR reference measurements are used to generate the database for positioning. For any device to be positioned, there is a need to either have measurements in the LTE/5G-NR reference frame, as in prior art, or a need to translate the measurements to the LTE/5G-NR reference frame, as according to the present embodiment. The use of the transforming operator takes place during an actual positioning determination.

Figure 13:
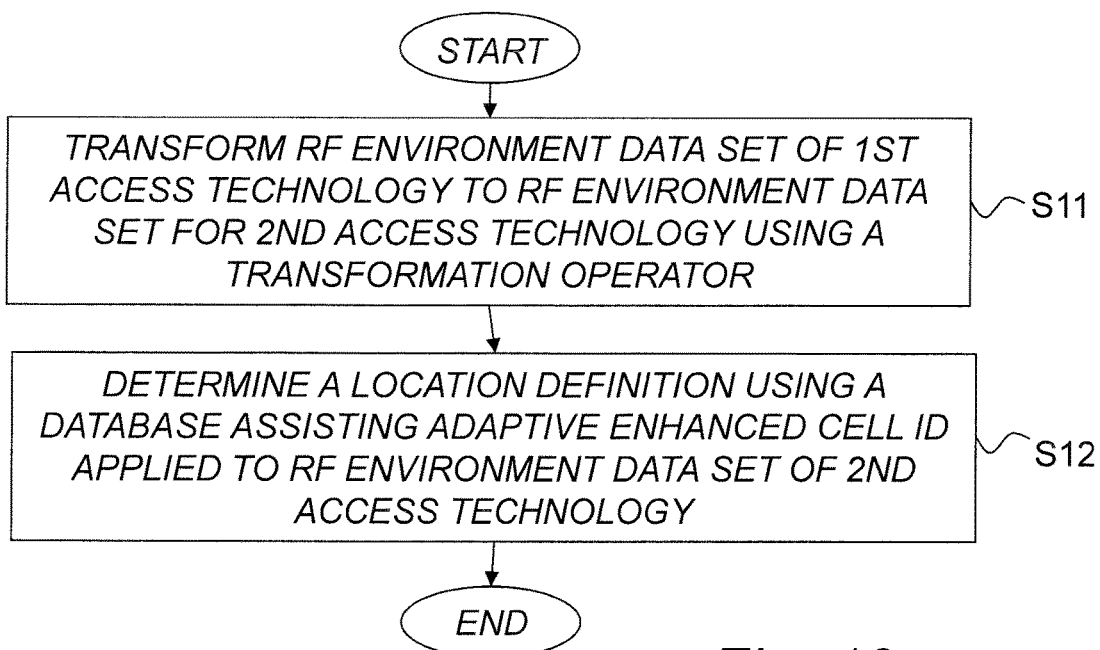
FIG. 13 illustrates a flow diagram of steps of an embodiment of a method for position determination in a wireless communication system.

This embodiment thus presents a method for position determination in a wireless communication system. A flow diagram of steps of an embodiment of such a method is illustrated in FIG. 13. The method comprises a step S11, transforming an obtained radio frequency environment data set of a first access technology for a wireless device to be positioned into a radio frequency environment data set of a second access technology by using a transformation operator. The transformation operator is created according to a method for assisting in position determination in a wireless communication system as described further above. A location definition of the wireless device to be positioned is in step S12 determined by using a (second) database, assisting in positioning by Adaptive Enhanced Cell ID, applied to the radio frequency environment data set of the second access technology for the wireless device to be positioned, giving a location definition for the wireless device to be positioned. The second database represents relations between radio frequency environment data sets of the second access technology and respective location definitions. The location definitions are positions or area definitions.

Figure 14:
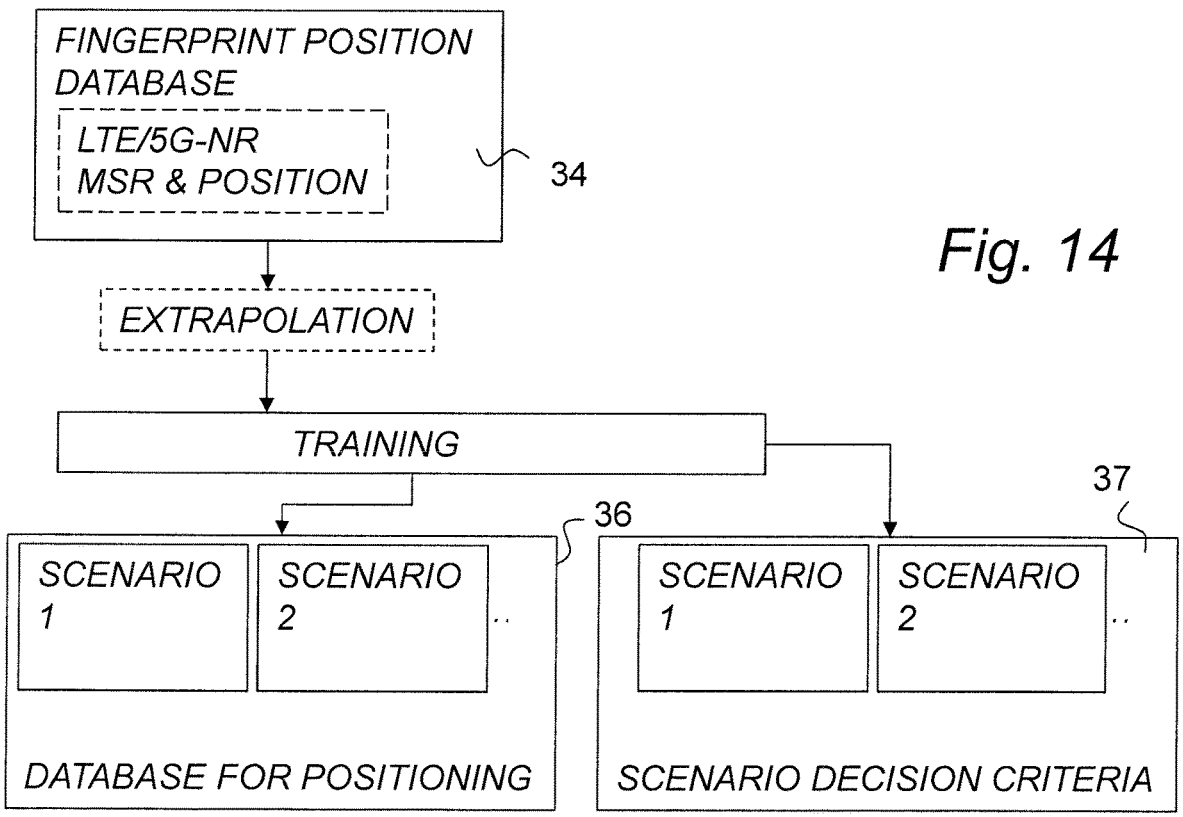
FIG. 14 is an illustration of measurements trained into a positioning database without measurements translated into a first access technology.

In the present embodiment, the raw measurements, or compilations thereof, are made in a specific reference frame, the reference frame of the first access technology, e.g. IoT. These raw measurements may also be combined with aspects such as region, radio environment, coverage situation and/or device. One embodiment is illustrated schematically in FIG. 14. A fingerprint position database 34 is collected, and possibly also at least partly compiled, e.g. based on LTE/5G-NR measurements and corresponding accurate positions. This data source is, possibly also in combination with different extrapolation into "white" areas, used in a training operation. The training operation gives a database 36 for assisting in positioning, e.g. AECID, possibly divided into different scenario. Also, the training may give rise to scenario decision criteria 37 for the scenarios.

Figure 15:
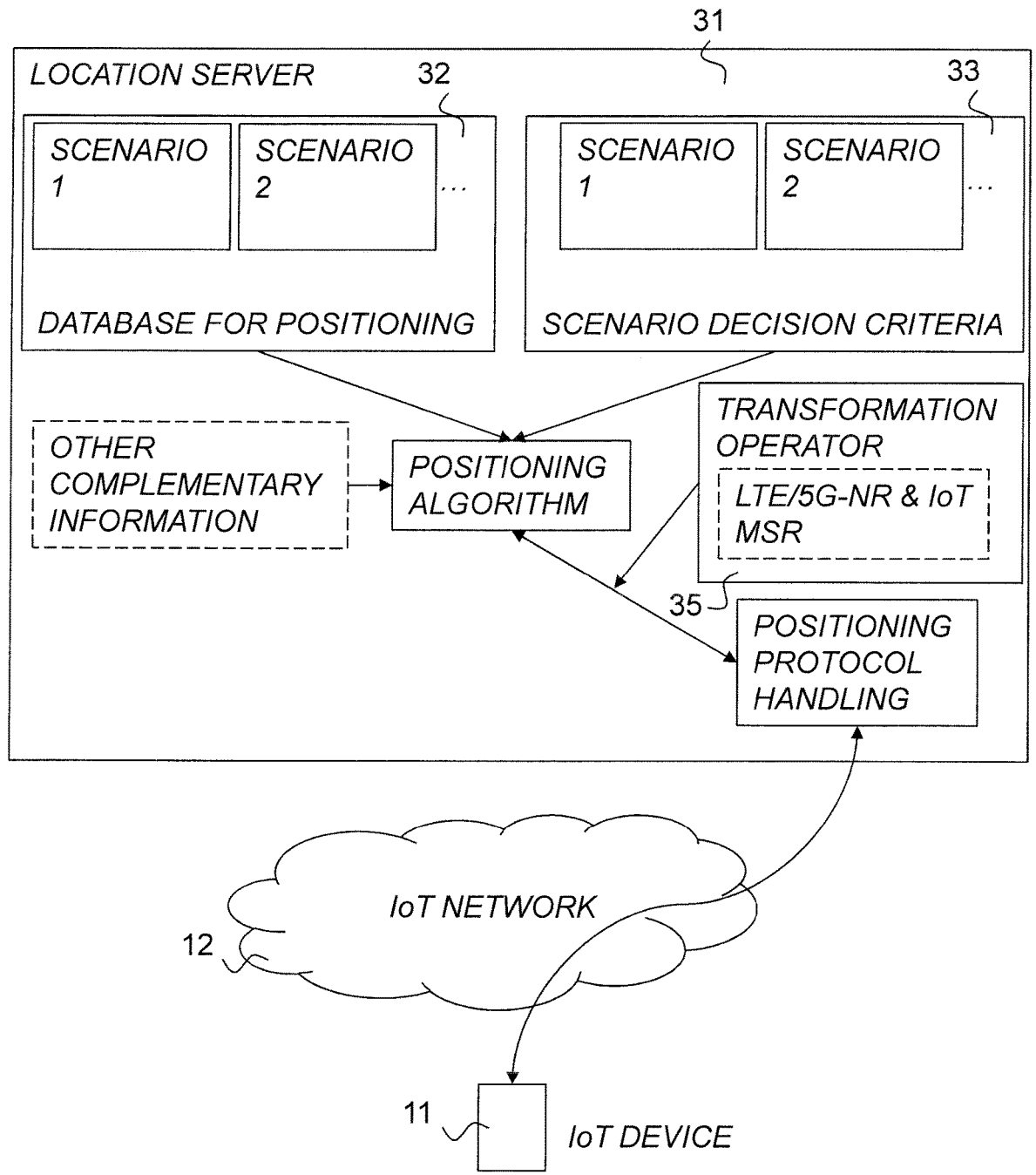
FIG. 15 is an illustration of the use of a trained positioning database with measurements translated into a second access technology.

After the training is done, the output in form of a database 36 for positioning is, as illustrated in FIG. 15, loaded to the location server 31 and the system is ready to take positioning traffic.

The positioning flow can be based on the Control Plane or the User Plane.

After getting a location request, the location server retrieves the IoT measurements measured by the IoT device 11, via the IoT network 12. The IoT measurements are transformed by assistance of the transformation operator 35 into a RF environment data set of a LTE/5G-NR reference frame. If a division into scenario is made, the scenario in which the device is, is decided by searching the scenario decision criteria 33. The target fingerprints version associated with the decided scenario in the fingerprints database is selected by use of the scenario decision criteria 33 based on the transformed RF environment data set.

The location server 31 performs the fingerprinting positioning algorithm and get the location estimate, optionally with other complementary information, e.g. cell data etc. The location estimate is reported back to the location initiator, i.e. the node responsible for initiating the location request.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like and other forms of IoT devices. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 16:
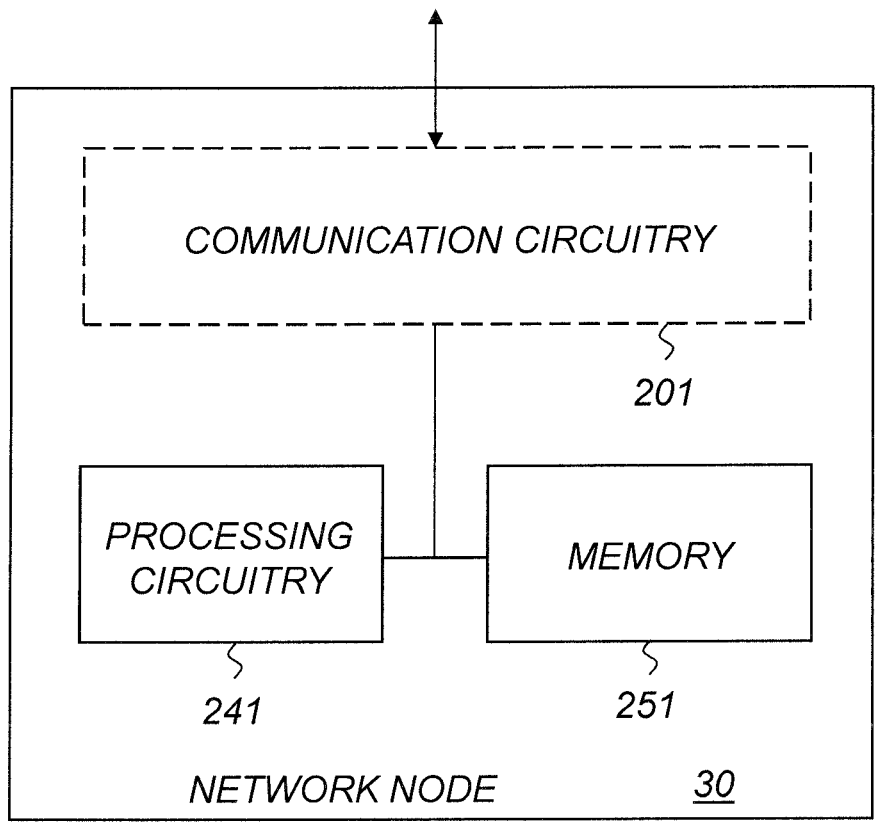
FIG. 16 is a schematic block diagram illustrating an embodiment of a network node.

FIG. 16 is a schematic block diagram illustrating an example of a network node 30, based on a processor-memory implementation according to an embodiment. In this particular example, the network node 30 comprises a processing circuitry 241 and a memory 251, the memory 251 comprising instructions executable by the processing circuitry 241, whereby the processing circuitry 241 is operative to obtain pairs of radio frequency environment data sets for each of a plurality of common positions. A said pair of radio frequency environment data sets comprises radio frequency environment data of a first access technology for a first wireless device connected by the first access technology and radio frequency environment data of a second access technology for a second wireless device connected by the second access technology, respectively. The first access technology is different from the second access technology. The first wireless device is co-located with the second wireless device at a common position. The processing circuitry is further operative to create a transformation operator based on the plurality of the pairs of the radio frequency environment data sets. The transformation operator represents a relation between radio frequency environment data sets of the first and second access technology, respectively. Thereby, a radio frequency environment data set of the first access technology inputted into the transformation operator gives an output of an estimation of a radio frequency environment data set of the second access technology and/or a radio frequency environment data set of the second access technology inputted into the transformation operator gives an output of an estimation of a radio frequency environment data set of the first access technology.

Optionally, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processing circuitry 241 and/or memory 251. By way of example, the communication circuit 201 may include any of the following: a receiver, a transmitter, a transceiver, input/output (I/O) circuitry, input port(s) and/or output port(s).

In one embodiment of the network node, the first access technology is an access technology for Internet of Things.

In a further embodiment of the network node, the first access technology is an access technology for Cellular Internet of Things.

In another further one embodiment of the network node, the first access technology is an access technology according to Category M1.

In yet another further one embodiment of the network node, the first access technology is Narrow-Band Internet of Things.

In one embodiment of the network node, the second access technology is a Long-Term Evolution access technology.

In a further embodiment of the network node, the second access technology is a Fifth Generation New Radio access technology.

In one embodiment of the network node, the radio frequency environment data comprises at least one of radio signal strength of received radio signals within the concerned access technology, radio signal quality of received radio signals within the concerned access technology, angle of arrival of received radio signals within the concerned access technology, angle of departure of transmitted radio signals within the concerned access technology, identifiers of cells with which radio communication within the concerned access technology can be performed, identifiers of antenna beams by which radio communication within the concerned access technology can be performed, identifiers of transmission points from which radio communication within the concerned access technology can be performed, classification of an indoor or outdoor location and classification of radio propagation environment.

In one embodiment of the network node, the second antenna is the same as said first antenna.

In one embodiment of the network node, the second antenna is different but co-located with said first antenna.

In one embodiment of the network node, the radio frequency environment data comprises a radio signal strength of received radio signals within the concerned access technology and/or a radio signal quality of received radio signals within the concerned access technology. The network node is further configured to perform the creation of said transformation operator by at least one of creating a signal strength function transforming a radio signal strength of the first access technology into a radio signal strength of the second access technology, creating a signal strength function transforming a radio signal strength of the second access technology into a radio signal strength of the first access technology, creating a signal quality function transforming a radio signal quality of the first access technology into a radio signal quality of the second access technology and creating a signal quality function transforming a radio signal quality of the second access technology into a radio signal quality of the first access technology.

In one embodiment of the network node, the signal strength function and/or the signal quality function is a linear function.

In one embodiment of the network node, the signal strength function and/or the signal quality function is further dependent on a geographical region in which the common positions are situated.

In one embodiment of the network node, the signal strength function and/or the signal quality function is further dependent on a radio environment in which the common positions are situated.

In one embodiment of the network node, the signal strength function and/or the signal quality function is further dependent on a coverage situation of the common positions.

In one embodiment of the network node, the signal strength function and/or the signal quality function is specific for a type of wireless device for which the positioning is to be performed.

In one embodiment of the network node, the network node is further configured to perform the creation of said transformation operator by, for radio frequency environment data sets of the first access technology for which there does not exist any radio frequency environment data sets of the second access technology, creating estimated such radio frequency environment data sets of the second access technology by extrapolating, interpolating and/or by use of advanced machine learning techniques based on existing radio frequency environment data sets of the second access technology.

In one embodiment of the network node, the creation of estimated radio frequency environment data sets comprises utilization of models of building penetration losses.

In one embodiment of the network node, the network node is further configured to create a first database from a fingerprint position database using the inverse of the transformation operator. The first database assists in positioning by Adaptive Enhanced Cell ID and represents relations between radio frequency environment data sets of the first access technology and respective location definitions. The location definitions are positions or area definitions. The fingerprint position database represents relations between radio frequency environment data sets of the second access technology and positions where the radio frequency environment data sets were determined.

In a further embodiment of the network node, the network node is further configured to perform the creation of a first database based on a division of radio frequency environment data sets into scenarios, whereby each scenario is handled separately.

In yet a further embodiment of the network node, the scenarios comprise an indoor scenario and an outdoor scenario.

In one embodiment of the network node, the network node is further configured to obtain scenarios decision criteria by training on measured radio frequency environment data sets.

In one embodiment of the network node, the network node is further configured to enhance the accuracy of said first database by further utilizing radio frequency environment data sets of the first access technology having an associated measured or estimated location of the wireless device.

According to another aspect of the proposed technology, FIG. 16 illustrates a network node configured to determine positions in a wireless communication system. In this aspect, the processing circuitry 241 is operative to transform an obtained radio frequency environment data set for the wireless device to be positioned into a radio frequency environment data set of the second access technology for the wireless device to be positioned by using a transformation operator. The transformation operator is created according to a method for assisting in position determination in a wireless communication system as described further above. The processing circuitry is further operative to determine a location definition of the wireless device to be positioned by using a second database, assisting in positioning by Adaptive Enhanced Cell ID, applied to the radio frequency environment data set of the second access technology for the wireless device to be positioned, giving a location definition for the wireless device to be positioned. The second database represents relations between radio frequency environment data sets of the second access technology and respective location definitions. The location definitions are positions or area definitions.

Figure 17:
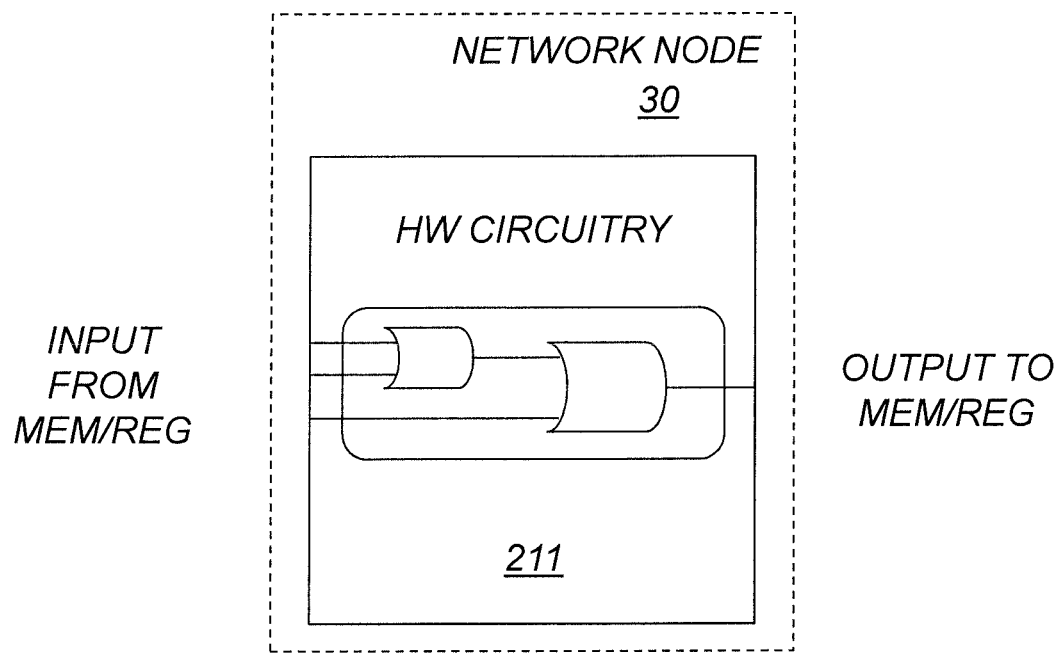
FIG. 17 is a schematic block diagram illustrating an embodiment of a network node based on a hardware circuitry implementation.

FIG. 17 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 18:
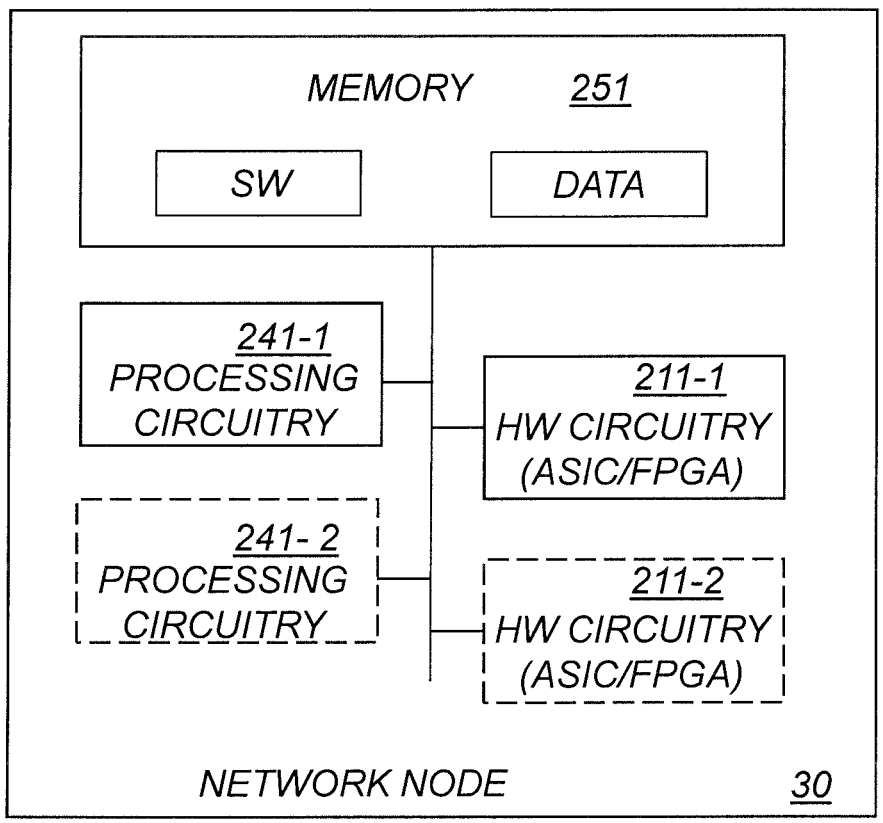
FIG. 18 is a schematic block diagram illustrating another embodiment of a network node based on combination of both processor and hardware circuitry.

FIG. 18 is a schematic block diagram illustrating yet another example of a network node 30, based on combination of both processing circuitry 241-1, 241-2 and hardware circuitry 211-1, 211-2 in connection with suitable memory unit(s) 251. The network node 30 comprises one or more units of processing circuitry 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more units of processing circuitry 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processor circuitry. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 19:
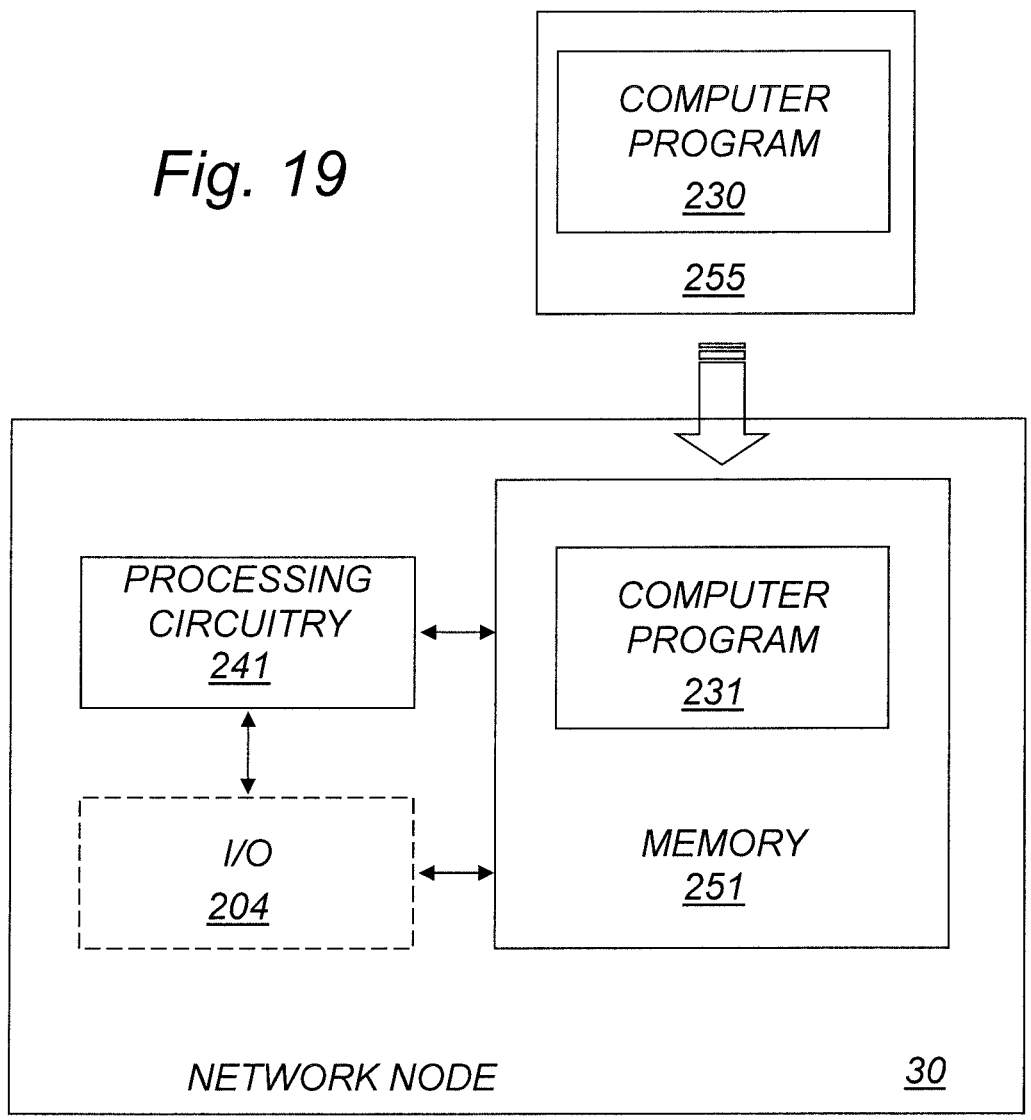
FIG. 19 is a schematic diagram illustrating an embodiment of a computer-implementation of a network node.

FIG. 19 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry 241. The processing circuitry 241 and memory 251 are interconnected to each other to enable normal software execution. An optional input/output device 204 may also be interconnected to the processing circuitry 241 and/or the memory 251 to enable input and/or output of relevant data such as input parameter(s) and/or resulting output parameter (s).

The term 'processing circuitry' should be interpreted in a general sense as any system or device capable of executing program code or computer program instructions to perform a particular processing, determining or computing task.

The processing circuitry 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by the processing circuitry 241, cause the processing circuitry 241 to obtain pairs of radio frequency environment data sets for each of a plurality of common positions. A said pair of radio frequency environment data sets comprises radio frequency environment data of a first access technology for a first wireless device connected by the first access technology and radio frequency environment data of a second access technology for a second wireless device connected by the second access technology, respectively. The first access technology is different from the second access technology. The first wireless device is co-located with the second wireless device at the common position. The instructions, when executed by the processing circuitry, cause the processing circuitry to further create a transformation operator based on the plurality of the pairs of the radio frequency environment data sets. The transformation operator represents a relation between radio frequency environment data sets of the first and second access technology, respectively. Thereby, a radio frequency environment data set of the first access technology inputted into the transformation operator gives an output of an estimation of a radio frequency environment data set of the second access technology and/or a radio frequency environment data set of the second access technology inputted into an inverse of the transformation operator gives an output of an estimation of a radio frequency environment data set of the first access technology.

In another particular embodiment, the computer program 231 comprises instructions, which when executed by the processing circuitry 241, cause the processing circuitry 241 to transform an obtained radio frequency environment data set for the wireless device to be positioned into a radio frequency environment data set of said second access technology for the wireless device to be positioned by using a transformation operator. The transformation operator is created according to a method for assisting in position determination in a wireless communication system according to the method description further above. The instructions, when executed by the processing circuitry, cause the processing circuitry to determine a location definition of the wireless device to be positioned by using a second database, assisting in positioning by Adaptive Enhanced Cell ID, applied to the radio frequency environment data set of the second access technology for the wireless device to be positioned, giving a location definition for the wireless device to be positioned. The second database represents relations between radio frequency environment data sets of the second access technology and respective location definitions. The location definitions are positions or area definitions.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

In one embodiment, a computer-program product comprises a computer-readable medium having stored thereon a computer program comprising instructions which, when executed on a processing circuitry, cause the processing circuitry to carry out the method according to the description further above.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 20:
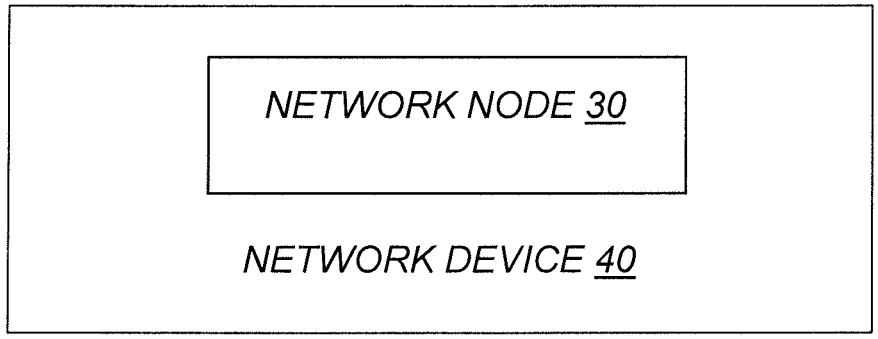
FIG. 20 is a schematic block diagram illustrating an embodiment of a network device.

FIG. 20 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit in a wireless communication system, wherein the communication unit comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 21:
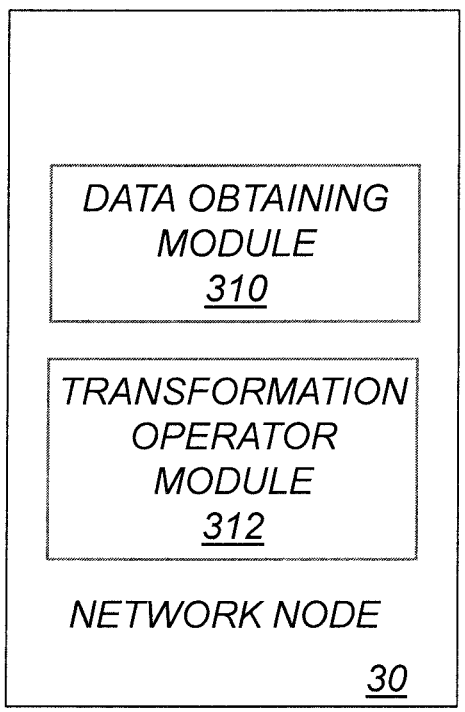
FIG. 21 is a schematic diagram illustrating an embodiment of a network node.

FIG. 21 is a schematic diagram illustrating an example of a network node 30 for assisting in position determination in a wireless communication system. The network node 30 comprises a data obtaining module 310 for obtaining pairs of radio frequency environment data sets for each of a plurality of common positions. A said pair of radio frequency environment data sets comprises radio frequency environment data of a first access technology for a first wireless device connected by the first access technology and radio frequency environment data of a second access technology for a second wireless device connected by said second access technology, respectively. The first access technology is different from the second access technology. The first wireless device is co-located with the second wireless device at the common position. The network node 30 further comprises a transformation operator module 312 for creating a transformation operator based on the plurality of the pairs of the radio frequency environment data sets. The transformation operator represents a relation between radio frequency environment data sets of the first and second access technology, respectively. Thereby, a radio frequency environment data set of the first access technology inputted into said transformation operator gives an output of an estimation of a radio frequency environment data set of the second access technology and/or a radio frequency environment data set of the second access technology inputted into an inverse of the transformation operator gives an output of an estimation of a radio frequency environment data set of the first access technology.

Figure 22:
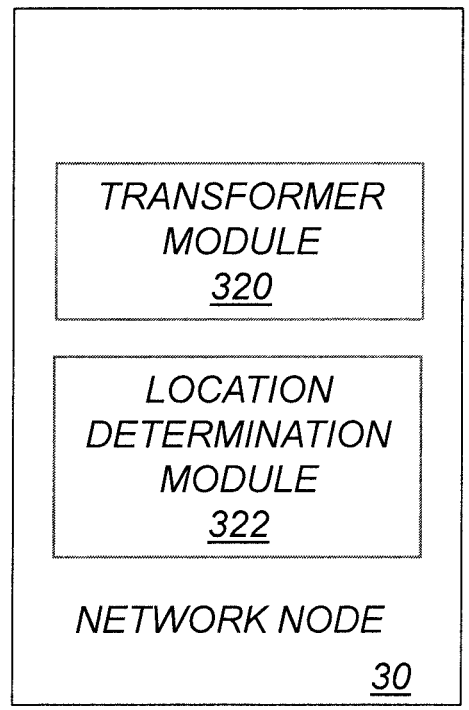
FIG. 22 is a schematic diagram illustrating another embodiment of a network node.

FIG. 22 is a schematic diagram illustrating an example of a network node 30 for position determination in a wireless communication system. The network node 30 comprises a transformer module 320 for transforming an obtained radio frequency environment data set of a first access technology for a wireless device to be positioned into a radio frequency environment data set of a second access technology by using a transformation operator. The transformation operator is created according to a method as described herein for assisting in position determination in a wireless communication system. The network node 30 further comprises a location determination module 322 for determining a location definition of the wireless device to be positioned by using a second database, assisting in positioning by Adaptive Enhanced Cell ID, applied to the radio frequency environment data set of the second access technology for the wireless device to be positioned, giving a location definition for the wireless device to be positioned. The second database represents relations between radio frequency environment data sets of the second access technology and respective location definitions. The location definitions are positions or area definitions.

Alternatively it is possible to realize the module(s) in FIGS. 21 and 22 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 23:
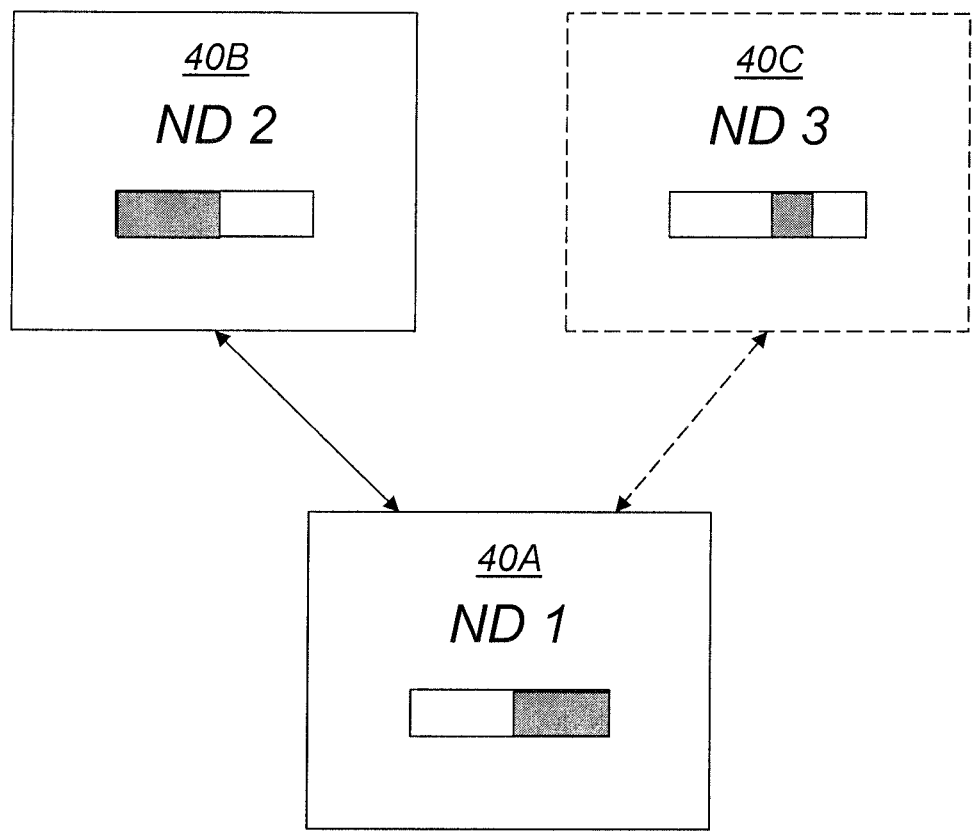
FIG. 23 is a schematic diagram illustrating a general example of functionality distribution or partition.

FIG. 23 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 24:
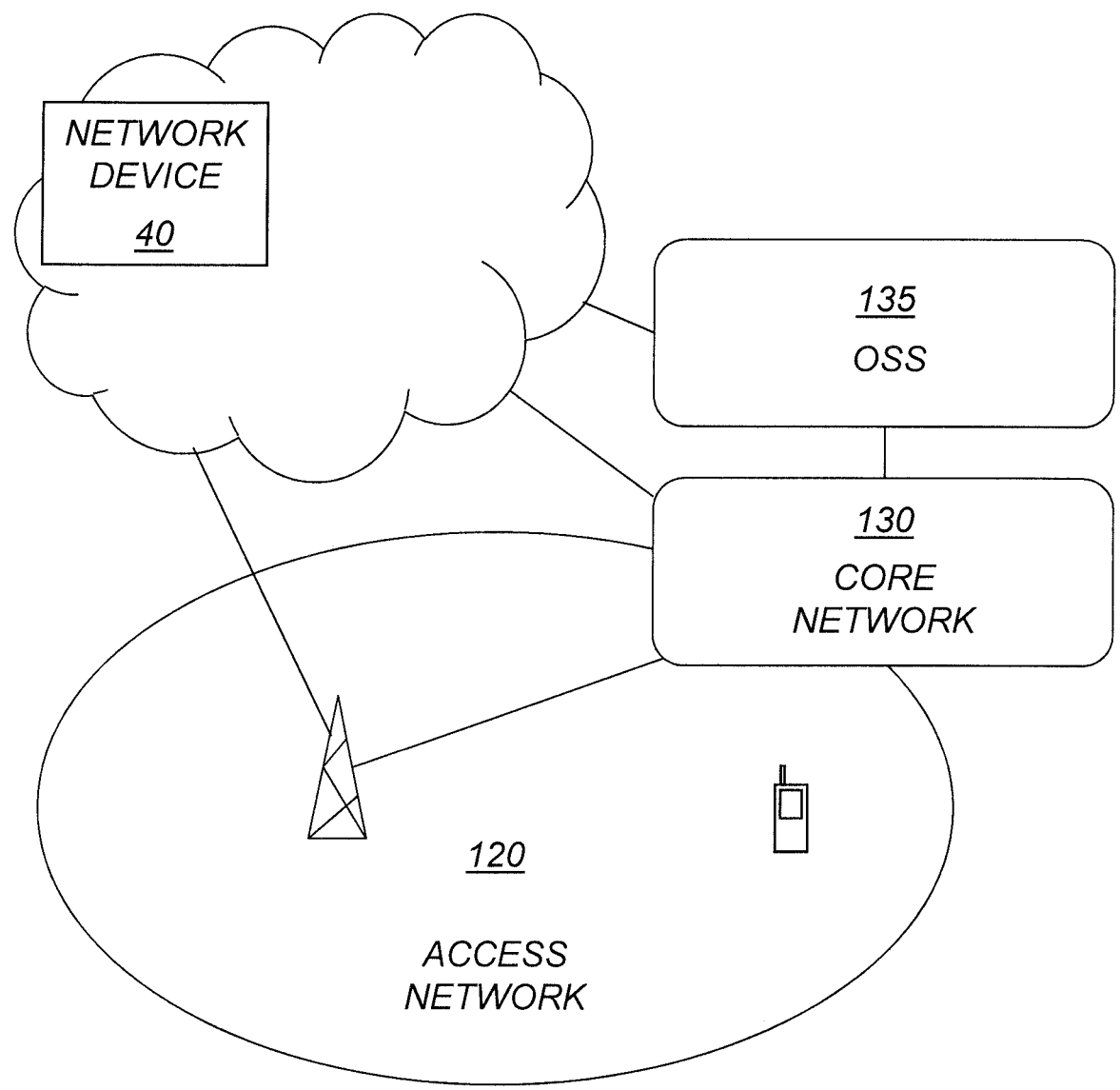
FIG. 24 is a schematic diagram illustrating an example of a wireless communication system in cooperation with one or more cloud-based network devices.

FIG. 24 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 25:
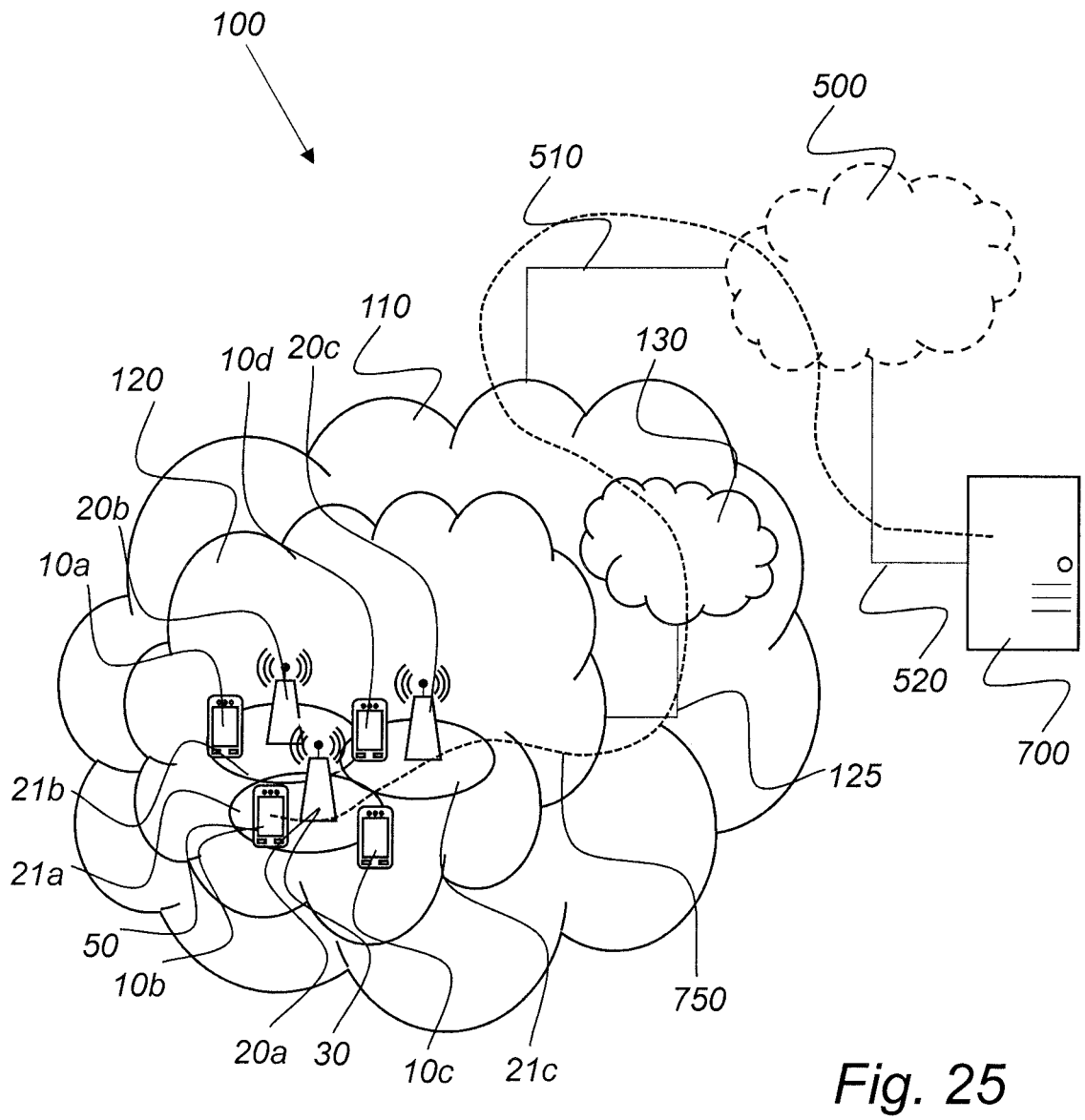
FIG. 25 schematically illustrates a telecommunication network connected via an intermediate network to a host computer.

With reference to FIG. 25, in accordance with an embodiment, a communication system 100 includes a telecommunication network 110, such as a 3GPP-type cellular network, which comprises an access network 120, such as a Radio Access Network (RAN), and a Core Network (CN) 130. The access network 120 comprises a plurality of base stations 20a, 20b, 20c, such as Node Bs (NB), evolved Node Bs (eNB), New Radio Node Bs (gNB) or other types of wireless access points, each defining a corresponding coverage area 21a, 21b, 21c. Each base station 20a, 20b, 20c is connectable to the CN 130 over a wired or wireless connection 125. A first user equipment (UE) 10a located in coverage area 21c is configured to wirelessly connect to, or be paged by, the corresponding base station 20c. A second UE 10b in coverage area 21a is wirelessly connectable to the corresponding base station 20a. While a plurality of UEs 10a-d are illustrated in this example, the disclosed embodiments are equally applicable to a situation where a sole UE is in the coverage area or where a sole UE is connecting to the corresponding base station 20.

The base station 20 is one type of a network node 30. Many operations that in a typical application are performed in a base station 20 may alternatively be performed in another network node 30 or even in a node external to the telecommunication network 110. The devices and methods described here below as being performed in a base station 20 should be interpreted as also being possible to perform in a general network node 30.

The UE 10 is one type of a wireless device 11. Many operations that in a typical application are performed in a UE 10 may alternatively be performed in any other wireless device 11. The devices and methods described here below as being performed in a UE 10 should be interpreted as also being possible to perform in a general wireless device 11.

The telecommunication network 110 is itself connected to a host computer 700, which may be embodied in the hardware and/or software of a standalone server, a cloud implemented server, a distributed server or as processing resources in a server farm. The host computer 700 may be under the ownership or control of a service provider, or may be operated by the service provider or on behalf of the service provider. The connections 510, 520 between the telecommunication network 110 and the host computer 700 may extend directly from the CN 130 to the host computer 700 or may go via an optional intermediate network 500. The intermediate network 500 may be one of, or a combination of more than one of, a public, private or hosted network; the intermediate network 500, if any, may be a backbone network or the Internet; in particular, the intermediate network 500 may comprise two or more sub-networks (not shown).

The communication system of FIG. 25 as a whole enables connectivity between one of the connected UEs 10*a*-*d* and the host computer 700. The connectivity may be described as an over-the-top (OTT) connection 750. The host computer 700 and the connected UEs 10*a*-*d* are configured to communicate data and/or signaling via the OTT connection 750, using the access network 120, the CN 130, any intermediate network 500 and possible further infrastructure (not shown) as intermediaries. The OTT connection 750 may be transparent in the sense that the participating communication devices through which the OTT connection 750 passes are unaware of routing of uplink and downlink communications. For example, a base station 20 may not or need not be informed about the past routing of an incoming downlink communication with data originating from a host computer 700 to be forwarded (e.g., handed over) to a connected UE 10. Similarly, the base station 20 need not be aware of the future routing of an outgoing uplink communication originating from the UE 10 towards the host computer 700.

Example implementations, in accordance with an embodiment, of the UE, base station and host computer discussed in the preceding paragraphs will now be described with reference to FIG. 26. In a communication system 100, a host computer 700 comprises hardware 710 including a communication interface 730 configured to set up and maintain a wired or wireless connection with an interface of a different communication device of the communication system 100. The host computer 700 further comprises processing circuitry 740, which may have storage and/or processing capabilities. In particular, the processing circuitry 740 may comprise one or more programmable processors, application-specific integrated circuits, field programmable gate arrays or combinations of these (not shown) adapted to execute instructions. The host computer 700 further comprises software 720, which is stored in or accessible by the host computer 700 and executable by the processing circuitry 740. The software 720 includes a host application 722. The host application 722 may be operable to provide a service to a remote user, such as a UE 10 connecting via an OTT connection 750 terminating at the UE 10 and the host computer 700. In providing the service to the remote user, the host application 722 may provide user data which is transmitted using the OTT connection 750.

The communication system 100 further includes a base station 20 provided in a telecommunication system and comprising hardware 155 enabling it to communicate with the host computer 700 and with the UE 10. The hardware 155 may include a communication interface 150 for setting up and maintaining a wired or wireless connection with an interface of a different communication device of the communication system 100, as well as a radio interface 160 for setting up and maintaining at least a wireless connection 165 with a UE 10 located in a coverage area (not shown in FIG. 26) served by the base station 20. The same is valid for IoT devices. The communication interface 150 may be configured to facilitate a connection 151 to the host computer 700. The connection 151 may be direct or it may pass through a CN (not shown in FIG. 26) of the telecommunication system and/or through one or more intermediate networks outside the telecommunication system. In the embodiment shown, the hardware 155 of the base station 20 further includes processing circuitry 170, which may comprise one or more programmable processors, application-specific integrated circuits, field programmable gate arrays or combinations of these (not shown) adapted to execute instructions. The base station 20 further has software 156 stored internally or accessible via an external connection.

The communication system 100 further includes the UE 10 already referred to. Its hardware 185 may include a radio interface 180 configured to set up and maintain a wireless connection 165 with a base station serving a coverage area in which the UE 10 is currently located. The hardware 185 of the UE 10 further includes processing circuitry 190, which may comprise one or more programmable processors, application-specific integrated circuits, field programmable gate arrays or combinations of these (not shown) adapted to execute instructions. The UE 10 further comprises software 186, which is stored in or accessible by the UE 10 and executable by the processing circuitry 190. The software 186 includes a client application 192. The client application 192 may be operable to provide a service to a human or non-human user via the UE 10, with the support of the host computer 700. In the host computer 700, an executing host application 722 may communicate with the executing client application 192 via the OTT connection 750 terminating at the UE 10 and the host computer 700. In providing the service to the user, the client application 192 may receive request data from the host application 722 and provide user data in response to the request data. The OTT connection 750 may transfer both the request data and the user data. The client application 192 may interact with the user to generate the user data that it provides.

Figure 26:
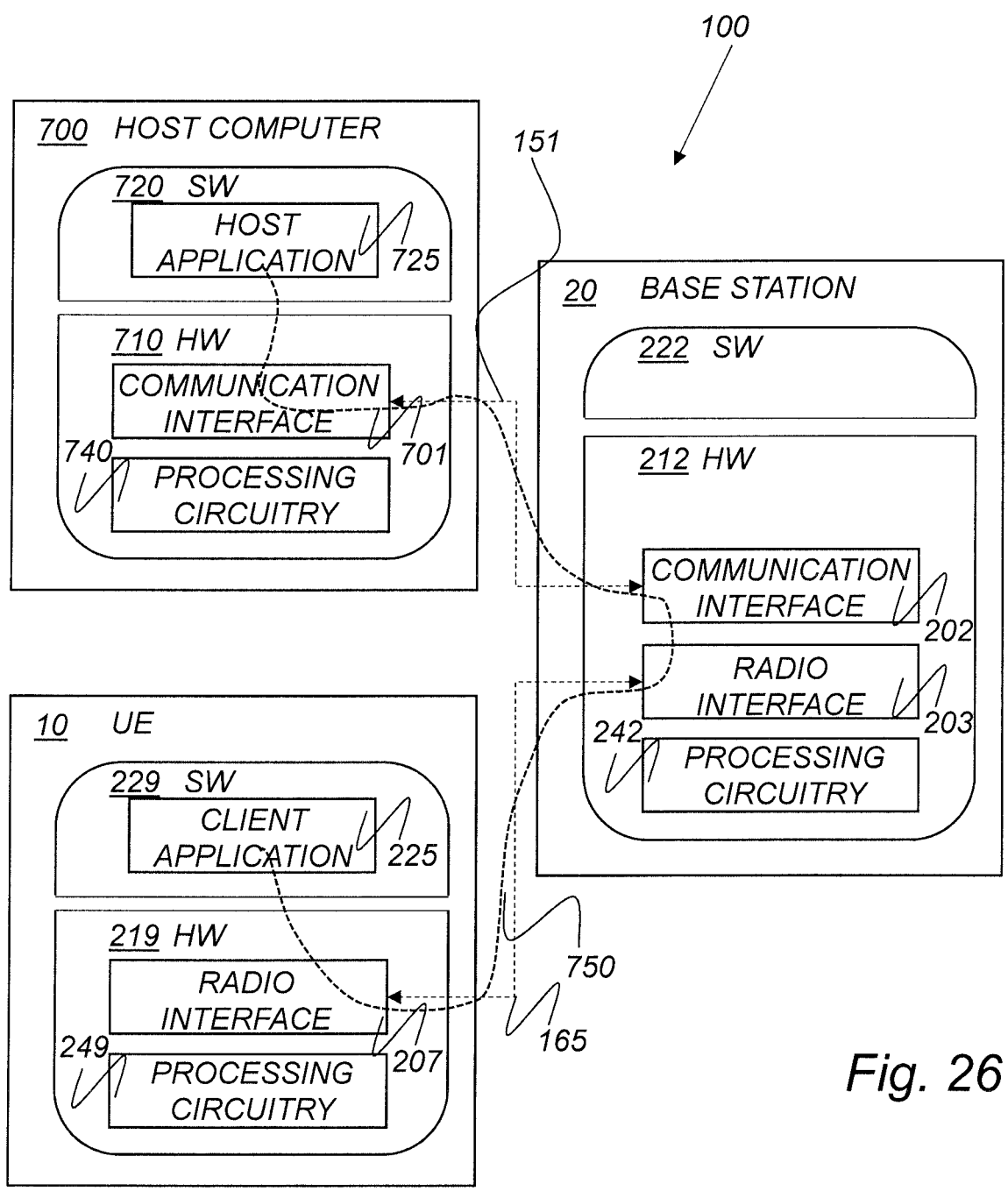
FIG. 26 is a generalized block diagram of a host computer communicating via a base station with a user equipment over a partially wireless connection.

It is noted that the host computer 700, base station 20 and UE 10 illustrated in FIG. 26 may be identical to the host computer 700, one of the base stations 20*a*, 20*b*, 20*c* and one of the UEs 10*a*-*d* of FIG. 25, respectively. This is to say, the inner workings of these entities may be as shown in FIG. 26 and independently, the surrounding network topology may be that of FIG. 25.

In this context, the UE 10 may also be an IoT device.

In FIG. 26, the OTT connection 750 has been drawn abstractly to illustrate the communication between the host computer 700 and the use equipment 10 via the base station 20, without explicit reference to any intermediary devices and the precise routing of messages via these devices. Network infrastructure may determine the routing, which it may be configured to hide from the UE 10 or from the service provider operating the host computer 700, or both.

While the OTT connection 750 is active, the network infrastructure may further take decisions by which it dynamically changes the routing (e.g., on the basis of load balancing consideration or reconfiguration of the network).

The wireless connection 165 between the UE 10 and the base station 20 is in accordance with the teachings of the embodiments described throughout this disclosure. One or more of the various embodiments improve the performance of OTT services provided to the UE 10 using the OTT connection 700, in which the wireless connection 165 forms the last segment. More precisely, the teachings of these embodiments may improve the location selectivity and thereby provide benefits such as improved accuracy in responsiveness and for providing relevant data.

A measurement procedure may be provided for the purpose of monitoring data rate, latency and other factors on which the one or more embodiments improve. There may further be an optional network functionality for reconfiguring the OTT connection 750 between the host computer 700 and UE 10, in response to variations in the measurement results. The measurement procedure and/or the network functionality for reconfiguring the OTT connection 750 may be implemented in the software 720 of the host computer 700 or in the software 186 of the UE 10, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 720, 186 may compute or estimate the monitored quantities. The reconfiguring of the OTT connection 750 may include message format, retransmission settings, preferred routing etc.; the reconfiguring need not affect the base station 20, and it may be unknown or imperceptible to the base station 20. Such procedures and functionalities may be known and practiced in the art. In certain embodiments, measurements may involve proprietary UE signaling facilitating the host computer's 700 measurements of throughput, propagation times, latency and the like. The measurements may be implemented in that the software 720 causes messages to be transmitted, in particular empty or 'dummy' messages, using the OTT connection 750 while it monitors propagation times, errors etc.

The embodiments described above are merely given as examples, and it should 5 be understood that the proposed technology is not limited thereto. It will be understood by those skilled in the art that various modifications, combinations and changes may be made to the embodiments without departing from the present scope as defined by the appended claims. In particular, different part solutions in the different embodiments can be 10 combined in other configurations, where technically possible.

ABBREVIATIONS

3GPP Third Generation Partnership Project
5G-NR Fifth Generation New Radio
AECID Adaptive Enhanced Cell ID
A-GNSS Assisted Global Navigation Satellite Systems
AoA Angle of Arrival
AoD Angle of Departure
ASIC Application Specific Integrated Circuits
BTS Base Transceiver Stations
Cat-M1 Category M1
CD Compact Disc
CDMA Code Division Multiple Access
CN Core Network
CIOT Cellular IoT
COTS Common Off-The-Shelf
CPE Customer Premises Equipment
CPU Central Processing Units
CSI-RS Channel State Information—Reference Signals
DSP Digital Signal Processors
DVD Digital Versatile Disc
eNB evolved Node B
EUTRAN Evolved Universal Terrestrial Radio Access Network
FPGA Field Programmable Gate Arrays
gNB New Radio Node B
GNSS Global Navigation Satellite Systems
GPS Global Positioning System
GSM Global System for Mobile communications
HDD Hard Disk Drive
HW hardware
I/O input/output
IoT Internet of Thing
LCS Control Plane Location Services
LEE Laptop Embedded Equipment
LME Laptop Mounted Equipment
LTE Long-Term Evolution
MDT Minimization of Drive Tests
MEM memory units
MSR raw measurement
MTC Machine Type Communications
NB Node B
NB-IOT Narrow Band IoT
ND Network Device
NFV Network Function Virtualization
NI Network Interfaces
NIC Network Interface Controller
OS Operating System
OSS Operations and Support System
PC Personal Computer
PDA Personal Digital Assistant
PLC Programmable Logic Controllers
RAB radio access bearer
RAM Random Access Memory
RAN Radio Access Network
RBS Radio Base Station
REG registers
ROM Read-Only Memory
RRU Remote Radio Units
RSRP Reference Signal Received Power
RSRQ Reference Signal Received Quality
RTT Round Trip Time
SS/PBCH Synchronization Signal/Physical Broadcast Channel
STA Station
SW software
TA Timing Advance
UE User Equipment
USB Universal Serial Bus
VM Virtual Machine
VMM Virtual Machine Monitor
VNE Virtual Network Element
WCDMA Wideband Code Division Multiple Access
WNIC Wireless Network Interface Controller

The invention claimed is:

1. A method for assisting in position determination in a wireless communication system, wherein said method comprises the steps of:
obtaining pairs of radio frequency environment data sets for each of a plurality of common positions;

a pair of said radio frequency environment data sets comprises radio frequency environment data of a first access technology for a first wireless device connected by said first access technology and radio frequency environment data of a second access technology for a second wireless device connected by said second access technology, respectively;

said first access technology being different from said second access technology;

said first wireless device being co-located with said second wireless device at one of said common positions;

creating a transformation operator based on said pairs of said radio frequency environment data sets;

said transformation operator representing a relation between radio frequency environment data sets of said first and second access technology, respectively;

whereby a radio frequency environment data set of said first access technology inputted into said transformation operator gives an output of an estimation of a radio frequency environment data set of said second access technology and/or a radio frequency environment data set of said second access technology inputted into an inverse of said transformation operator gives an output of an estimation of a radio frequency environment data set of said first access technology.

2. The method according to claim 1, wherein said first access technology is an access technology for Cellular Internet of Things.

3. The method according to claim 2, wherein said first access technology is an access technology according to Category M1 or Narrow-Band Internet of Things.

4. The method according to claim 1, wherein said second access technology is a Long-Term Evolution access technology or a Fifth Generation New Radio access technology.

5. The method according to claim 1, wherein said radio frequency environment data for either the first access technology or the second access technology as a concerned access technology comprises at least one of:
 radio signal strength of received radio signals within the concerned access technology;
 radio signal quality of received radio signals within the concerned access technology;
 angle of arrival of received radio signals within the concerned access technology;
 angle of departure of transmitted radio signals within the concerned access technology;
 identifiers of cells with which radio communication within the concerned access technology can be performed;
 identifiers of antenna beams by which radio communication within the concerned access technology can be performed;
 identifiers of transmission points from which radio communication within the concerned access technology can be performed;
 classification of an indoor or outdoor location; and
 classification of radio propagation environment.

6. The method according to claim 1, at least one of the following applies:
 said first wireless device is connected by said first access technology to an antenna of an antenna site and said second wireless device is connected by said second access technology to the same said antenna of said antenna site;
 said first wireless device is connected by said first access technology to a first antenna of an antenna site and said second wireless device is connected by said second access technology to a second antenna of said antenna site, wherein said second antenna is different but co-located with said first antenna; and
 said first wireless device is connected by said first access technology to a first antenna of a first antenna site and said second wireless device is connected by said second access technology to a second antenna of a second antenna site, said second antenna site being different from said first antenna site.

7. The method according to claim 1, wherein said radio frequency environment data for either the first access technology or the second access technology as a concerned access technology comprises:
 a radio signal strength of received radio signals within the concerned access technology;
 and/or a radio signal quality of received radio signals within the concerned access technology;
 whereby said step of creating said transformation operator comprises at least one of:
  creating of a signal strength function transforming a radio signal strength of said first access technology into a radio signal strength of said second access technology;
  creating of a signal strength function transforming a radio signal strength of said second access technology into a radio signal strength of said first access technology;
  creating of a signal quality function transforming a radio signal quality of said first access technology into a radio signal quality of said second access technology; and
  creating of a signal quality function transforming a radio signal quality of said second access technology into a radio signal quality of said first access technology.

8. The method according to claim 7, wherein said signal strength function and/or said signal quality function is further dependent on at least one of: a geographical region in which said common positions are situated, a radio environment in which said common positions are situated, and a coverage situation of said common positions.

9. The method according to claim 7, wherein said signal strength function and/or said signal quality function is specific for a type of wireless device for which the position determination is to be performed.

10. The method according to claim 1, wherein said step of creating said transformation operator comprises the further step of, for radio frequency environment data sets of said first access technology for which there does not exist any radio frequency environment data sets of said second access technology, creating estimated such radio frequency environment data sets of said second access technology by extrapolating, interpolating and/or by use of advanced machine learning techniques based on existing radio frequency environment data sets of said second access technology.

11. The method according to claim 10, wherein said creation of estimated radio frequency environment data sets comprises utilization of models of building penetration losses.

12. The method according to claim 1, comprising the further step of:
 creating a first database from a fingerprint position database using said inverse of said transformation operator;
 said first database assists in positioning by Adaptive Enhanced Cell ID and represents relations between radio frequency environment data sets of said first access technology and respective location definitions;

said location definitions being positions or area definitions;

said fingerprint position database representing relations between radio frequency environment data sets of said second access technology and positions where said radio frequency environment data sets were determined.

13. The method according to claim 12, wherein said step of creating a first database is based on a division of radio frequency environment data sets into scenarios, whereby each scenario is handled separately, and said scenarios comprises an indoor scenario and an outdoor scenario.

14. The method according to claim 13, wherein scenario decision criteria are obtained by training on measured radio frequency environment data sets.

15. The method according to claim 12, further comprising the further step of enhancing accuracy of said first database by further utilizing radio frequency environment data sets of said first access technology having an associated measured or estimated location of said first wireless device.

16. A method for position determination in a wireless communication system, wherein said method comprising the steps of:

transforming an obtained radio frequency environment data set of a first access technology for a wireless device to be positioned into a radio frequency environment data set of a second access technology by using a transformation operator;

determining a location definition of said wireless device to be positioned by using a second database, assisting in positioning by Adaptive Enhanced Cell ID, applied to said radio frequency environment data set of said second access technology for said wireless device to be positioned, giving the location definition for said wireless device to be positioned;

said second database representing relations between radio frequency environment data sets of said second access technology and respective location definitions;

said location definitions being positions or area definitions.

17. A network node configured to assist in position determination in a wireless communication system, said network node comprising a processing circuitry and a memory, said memory comprising instructions executable by the processing circuitry, whereby the processing circuitry is operative to obtain pairs of radio frequency environment data sets for each of a plurality of common positions;

a pair of said radio frequency environment data sets comprises radio frequency environment data of a first access technology for a first wireless device connected by said first access technology and radio frequency environment data of a second access technology for a second wireless device connected by said second access technology, respectively;

said first access technology being different from said second access technology;

said first wireless device being co-located with said second wireless device at one of said common positions; and whereby the processing circuitry is further operative to create a transformation operator based on said pairs of said radio frequency environment data sets;

said transformation operator representing a relation between radio frequency environment data sets of said first and second access technology, respectively;

whereby a radio frequency environment data set of said first access technology inputted into said transformation operator gives an output of an estimation of a radio frequency environment data set of said second access technology and/or a radio frequency environment data set of said second access technology inputted into an inverse of said transformation operator gives an output of an estimation of a radio frequency environment data set of said first access technology.

* * * * *